US008700190B2

(12) United States Patent
Wang et al.

(10) Patent No.: US 8,700,190 B2
(45) Date of Patent: Apr. 15, 2014

(54) METHOD FOR GENERATING TRAJECTORIES FOR MOTOR CONTROLLED ACTUATORS

(75) Inventors: Yebin Wang, Acton, MA (US); Yiming Zhao, Watertown, MA (US); Scott A. Bortoff, Brookline, MA (US)

(73) Assignee: Mitsubishi Electric Research Labs., Cambridge, MA (US)

( * ) Notice: Subject to any disclaimer, the term of this patent is extended or adjusted under 35 U.S.C. 154(b) by 339 days.

(21) Appl. No.: 13/204,499

(22) Filed: Aug. 5, 2011

(65) Prior Publication Data

US 2013/0035773 A1  Feb. 7, 2013

(51) Int. Cl.
*G05B 13/02* (2006.01)

(52) U.S. Cl.
USPC .............................. 700/33; 701/300; 318/587

(58) Field of Classification Search
USPC .............................. 700/33; 701/300; 318/587
See application file for complete search history.

(56) References Cited

U.S. PATENT DOCUMENTS

| 5,004,968 | A | | 4/1991 | Mizuno | |
|---|---|---|---|---|---|
| 5,612,883 | A | * | 3/1997 | Shaffer et al. | 701/300 |
| 5,629,855 | A | * | 5/1997 | Kyrtsos et al. | 701/300 |
| 5,640,323 | A | * | 6/1997 | Kleimenhagen et al. | 701/1 |
| 5,646,845 | A | * | 7/1997 | Gudat et al. | 701/41 |
| 5,680,306 | A | * | 10/1997 | Shin et al. | 701/23 |
| 5,680,313 | A | * | 10/1997 | Whittaker et al. | 701/300 |
| 5,684,696 | A | * | 11/1997 | Rao et al. | 701/25 |
| 5,838,562 | A | * | 11/1998 | Gudat et al. | 701/23 |
| 5,956,250 | A | * | 9/1999 | Gudat et al. | 701/26 |
| 6,216,058 | B1 | | 4/2001 | Hosek | |
| 2003/0018400 | A1 | * | 1/2003 | Tuttle et al. | 700/29 |
| 2013/0013132 | A1 | * | 1/2013 | Yakimenko | 701/3 |

OTHER PUBLICATIONS

Hussein et al. "On Smooth and Safe Trajectory Planning in 2D Environments," Robotics and Automation, 1997. IEEE International Conference on, Albuquerque, NM, US. Apr. 20-25, 1997.
Guan et al. "On Robotic Trajectory Planning using Polynomial Interpolations," 2005 IEEE International Conference on Robotics and Biometrics—Robio Shatin, N.T. China. Jul. 5, 2005.

* cited by examiner

*Primary Examiner* — Mohammad Ali
*Assistant Examiner* — Anthony Whittington
(74) *Attorney, Agent, or Firm* — Dirk Brinkman; Gene Vinokur

(57) ABSTRACT

A method generates trajectories for motor controlled actuators subject to dynamics, acceleration and velocity constraints. The method solves a constrained optimal control problem with dynamics, acceleration, and velocity constraints. The motor control problem is formulated as an optimal control problem using an energy cost function which is based on numerical optimization results. A solution to the two-point boundary value problem (TBVP) for the unconstrained case of the optimal control problem is obtained. The energy efficient motor control trajectory generation solver is designed for real time energy efficient trajectory generation. The solver converts a difficult multi-point boundary value problem (MBVP) associated with the state and acceleration constrained optimal control problem into an iterative solution for the TBVPs with updated boundary conditions.

13 Claims, 22 Drawing Sheets

METHOD FOR GENERATING TRAJECTORIES FOR MOTOR CONTROLLED ACTUATORS

FIELD OF THE INVENTION

The present invention relates to generally controlling electric motors, and more particularly generating trajectories for motor controlled actuators subject to dynamics, acceleration and velocity constraints.

BACKGROUND OF INVENTION

Motion control systems are used in number of positioning applications, e.g., single-axis positioning, and multiple-axis positioning. For example, a simple single-axis positioning motion control system generally includes sensors, controller, amplifier, and actuator motor. The actuator follows a predetermined trajectory subject to state and control constraints, i.e., dynamics, acceleration, velocity. The trajectory of the actuator can be designed to reduce vibration induced by the motor.

For two motor control cases, FIGS. 1A-1C and 2A-2C show optimal prior art time profiles for position, velocity, and control input, respectively. In the first case, an acceleration constraint is always active, while in the second case, the velocity constraint is saturated in a coasting part of the velocity profile, and the acceleration constraints are active in the other parts of the velocity profile. It is clear that when the control is optimized for minimize time, the control input contains significant large transitions, which are energy inefficient.

Although minimal time motor controllers generate the fastest trajectory for each motion, for a complex processes, minimal time controller may not help improve the overall productivity if a bottleneck of production is due to other slower processes, such as material processing. For example, there is no advantage in rapidly moving a work piece to a next state using excessive energy, if the piece is not going to be manipulated until later.

For such systems, minimal time controllers are not only unnecessary, but also inefficient because the controllers are not energy optimal. Furthermore, the efficiency of a plant depends not only on productivity, but also on other costs, such as energy consumption. The maximum efficiency is usually generated with certain trade-off between productivity and energy consumption. Therefore, strictly minimal time controllers, although useful in certain cases, do not increase efficiency in general, and minimizing energy consumption by relaxing time constraints should be considered for optimal motor control.

Optimal Control Theory

Optimal control deals with the problem of finding a control law for a system such that a certain optimality criterion is achieved. The control problem includes a cost function of state and control variables. An optimal control has to satisfy a set of differential equations describing paths of the control variables that minimize the cost function.

Pontryagin's minimal principle for optimal control theory determines the best possible control for taking a dynamical system from one state to another, especially in the presence of constraints on the state or control inputs. The optimal control theory provides a systematic way for determining the optimal solution to the problem of minimizing certain cost functions, such as time and energy, subject to various constraints, including dynamics constraint, boundary conditions (BC), state constraint, control constraint, and path constraint.

Therefore, the energy efficient motor control problem can be addressed as an optimal control problem.

The optimal control can be obtained by solving a two-point boundary value problem (TBVP), or a multi-point boundary value problem (MBVP) if the optimal solution contains multiple segments. This usually happens when control or state constraints are active. For the minimal time motor control problem, the optimal solution can be obtained analytically. Such an analytic solution forms the basis of many minimal time motor controllers.

However, for an energy saving optimal control problem, the corresponding TBVP and MBVP are difficult to solve, and no analytic solution is readily available. The existing indirect methods for solving the TBVP and MBVP, including single shooting method (SSM) and multiple shooting method (MSM), are computationally complex for real-time motion control applications. Besides, the convergence of those methods are generally not guaranteed, and rely on an initial guess of certain key parameters in the methods. Hence, due to the computation complexity issue and the reliability issue, the existing methods for solving TBVP and MBVP are difficult to be applied for real-time energy efficient trajectory generation in motor control applications.

The direct transcription method (direct method), provides an alternative way for solving optimal control problems. Similar to shooting methods, the convergence of the direct method is not guaranteed. A comprehensive evaluation of current direct methods, including a pseudo-spectral method and a mesh refinement method, shows that the direct method cannot provide motor control in real-time.

Thus, the known methods are insufficient in terms of computation efficiency and reliability for the real-time application of energy saving motor control. Due to these difficulties, there is a need for a method to generate energy efficient reference trajectories for motor control. Such a method should be computationally efficient for real-time motor control applications, and should be reliable. It is also desirable that such a method provides the capability to adjust the trade-off between execution time and energy saving for different applications.

SUMMARY OF INVENTION

The embodiments of the present invention provide methods for generating trajectories for motor controlled actuators subject to dynamics, acceleration and velocity constraints. The method considers the energy consumption of a motor motion control system due to resistive loss of the motor, and mechanical work. The motor motion control trajectory generation problem is formulated as an optimal control problem with different constraints comprising dynamic, acceleration, and velocity constraints.

The invention uses an analytic solution of an unconstrained case of motor control to search for the optimal solution of the constrained cases using an iterative process. Using optimal control terminologies, such an approach corresponds to solving a multi-point boundary value problem (MBVP) by iteratively solving a two-point boundary value problems (TBVP) until a termination condition is reached. For example, the termination condition is that all constraints on the solution, such as velocity and acceleration, are satisfied. Because the evaluation of analytic solutions is computationally efficient, the MBVP problem can be solved quickly. Special methods are provided to ensure that the iterative process is guaranteed to converge to the optimal solution.

DETAILED DESCRIPTION OF THE PREFERRED EMBODIMENTS

Figure 1A:
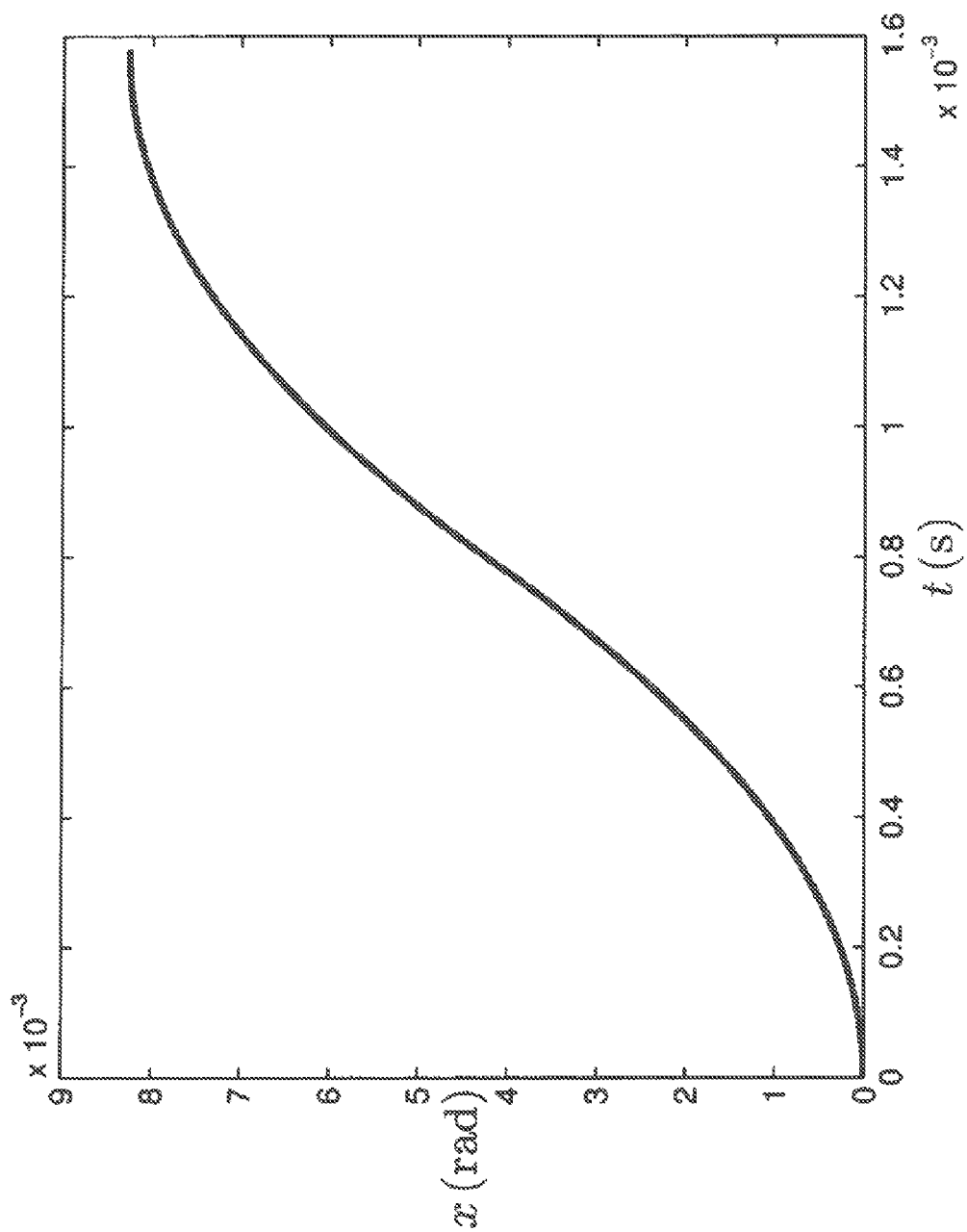
FIGS. 1A-1C are graphs of prior art time optimal motor control position, velocity, and control input profiles, respectively, for a case without velocity saturation.
Figure 1B:
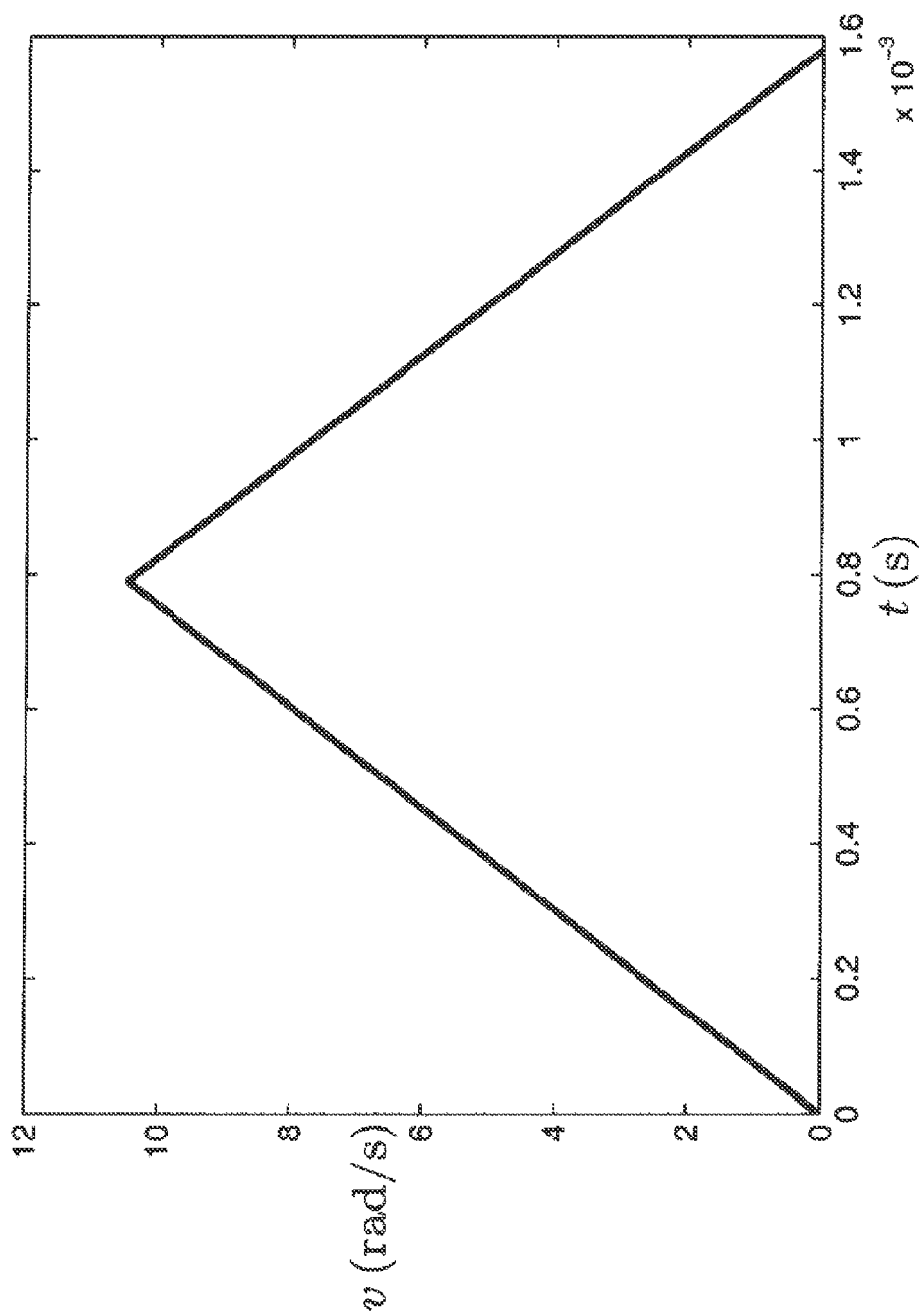
Figure 1C:
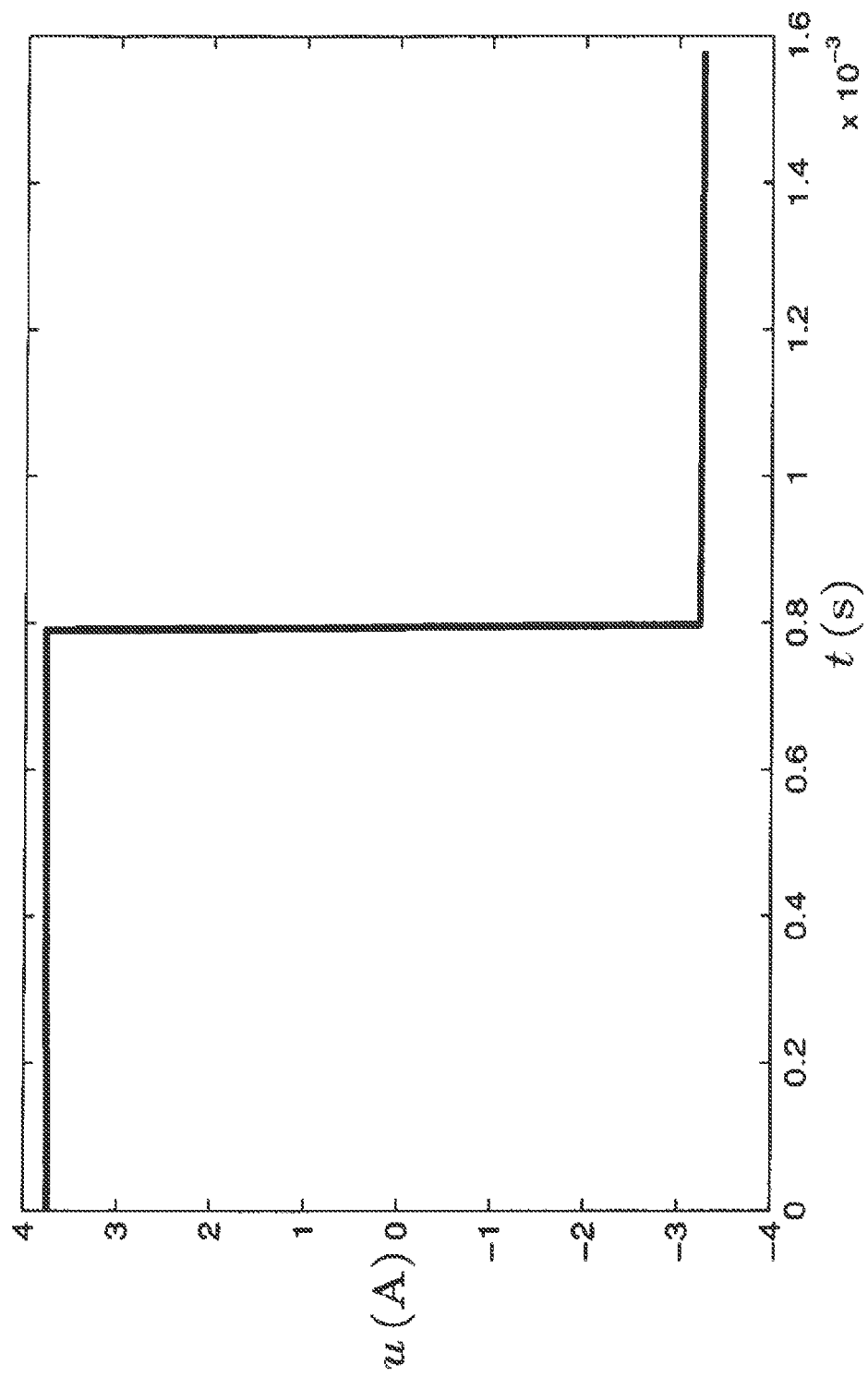
Figure 2A:
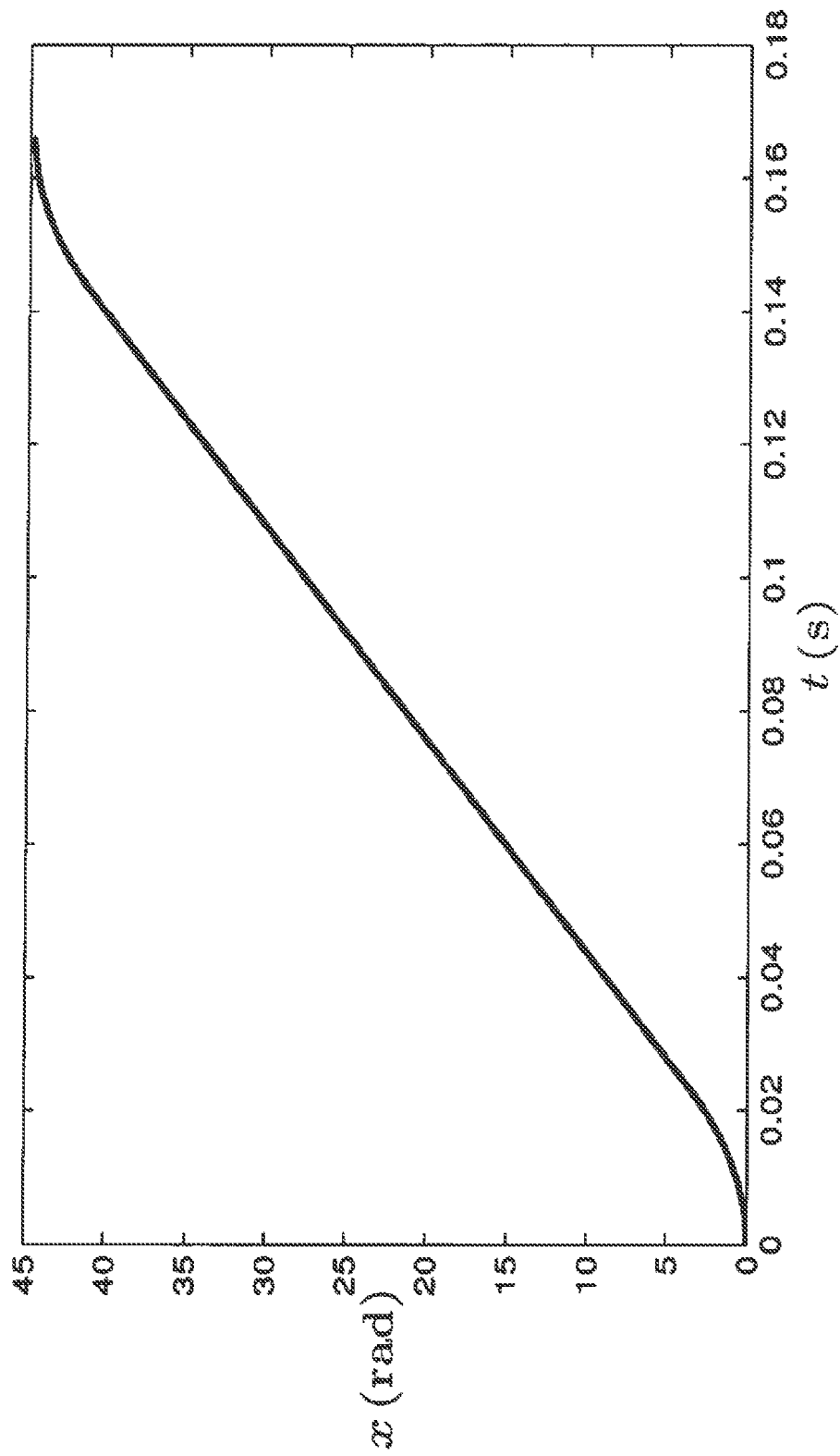
FIGS. 2A-2C are graphs of prior art time optimal motor control position, velocity, and control input profile, respectively, for a case with velocity saturation.
Figure 2B:
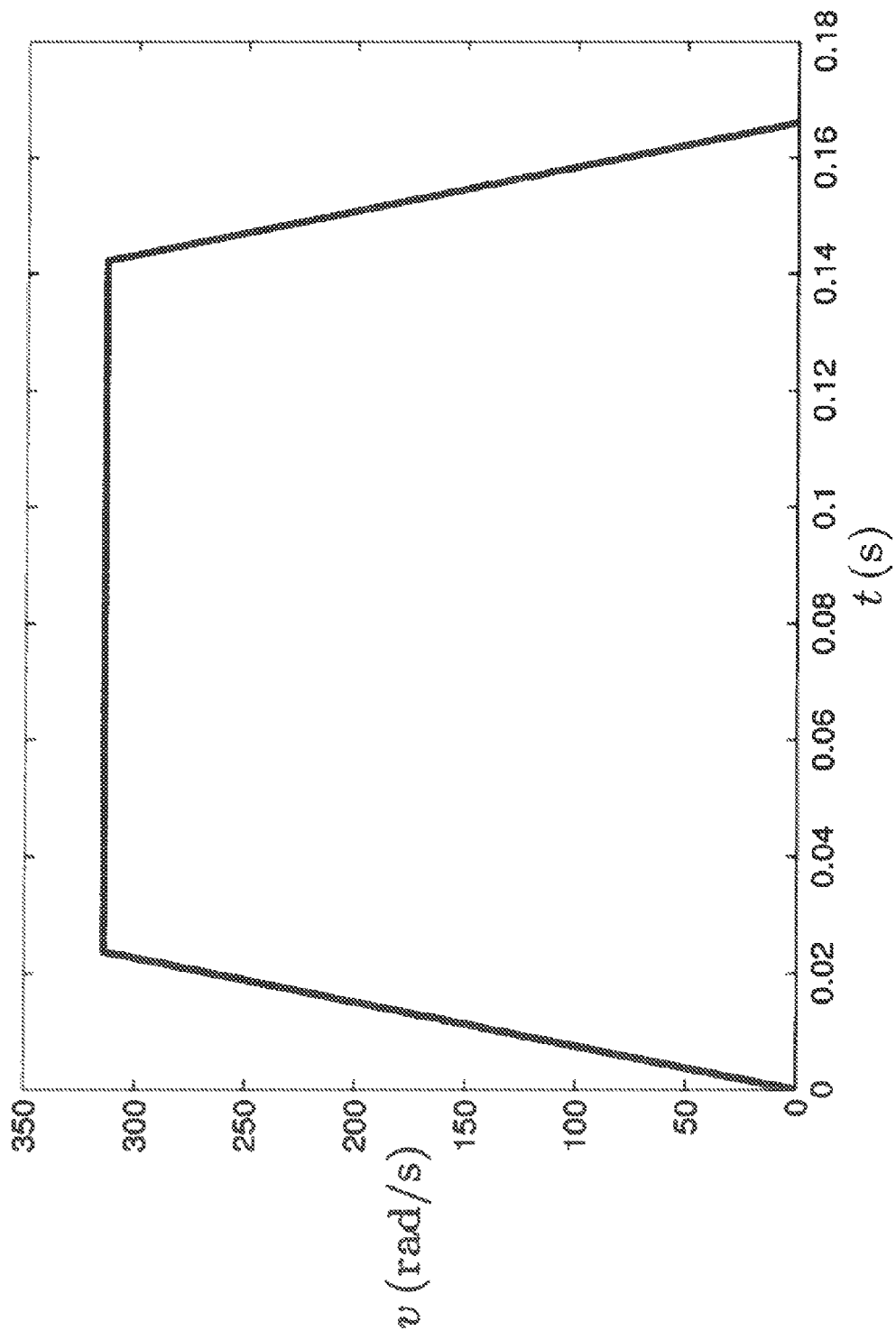
Figure 2C:
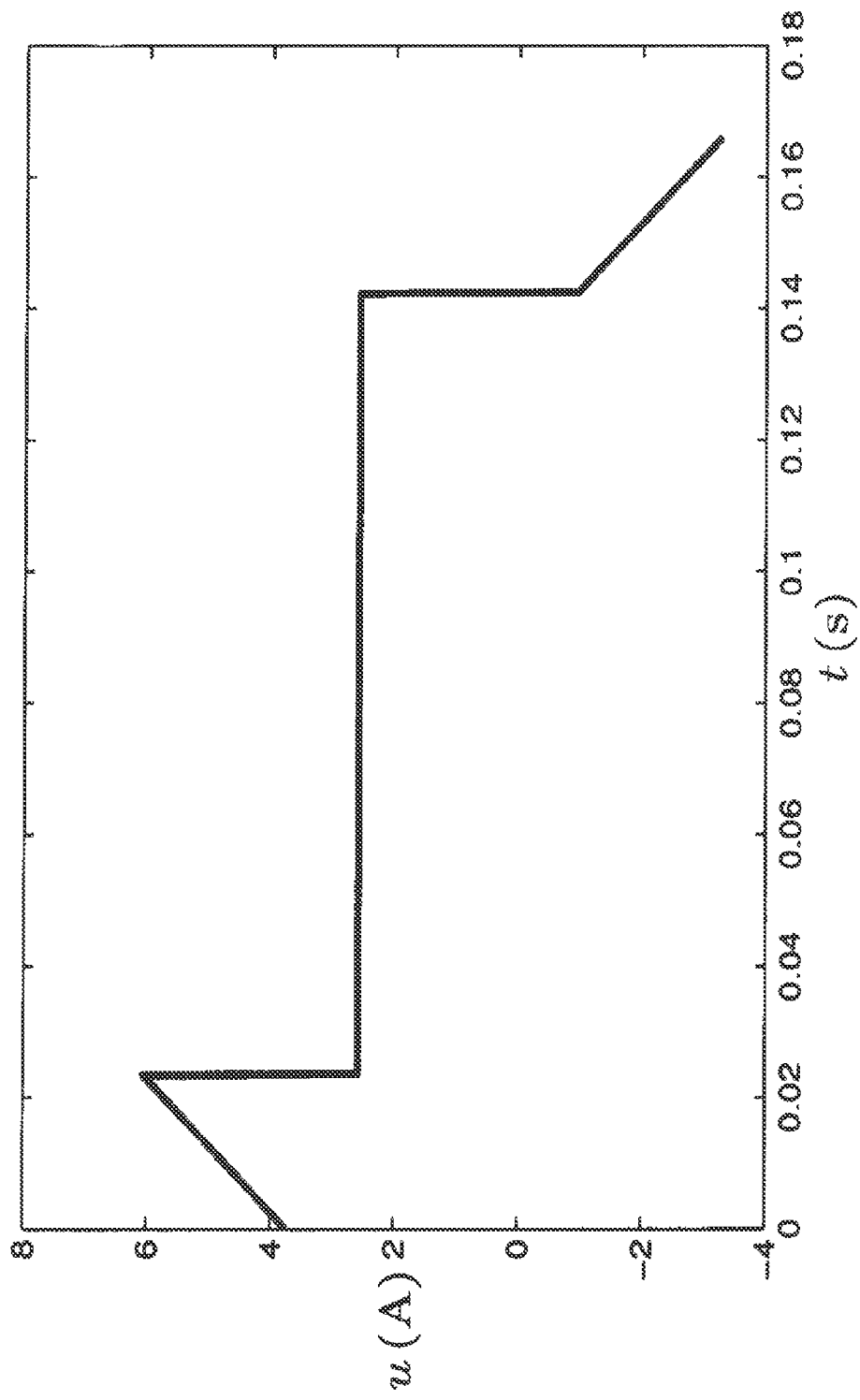
Figure 3:
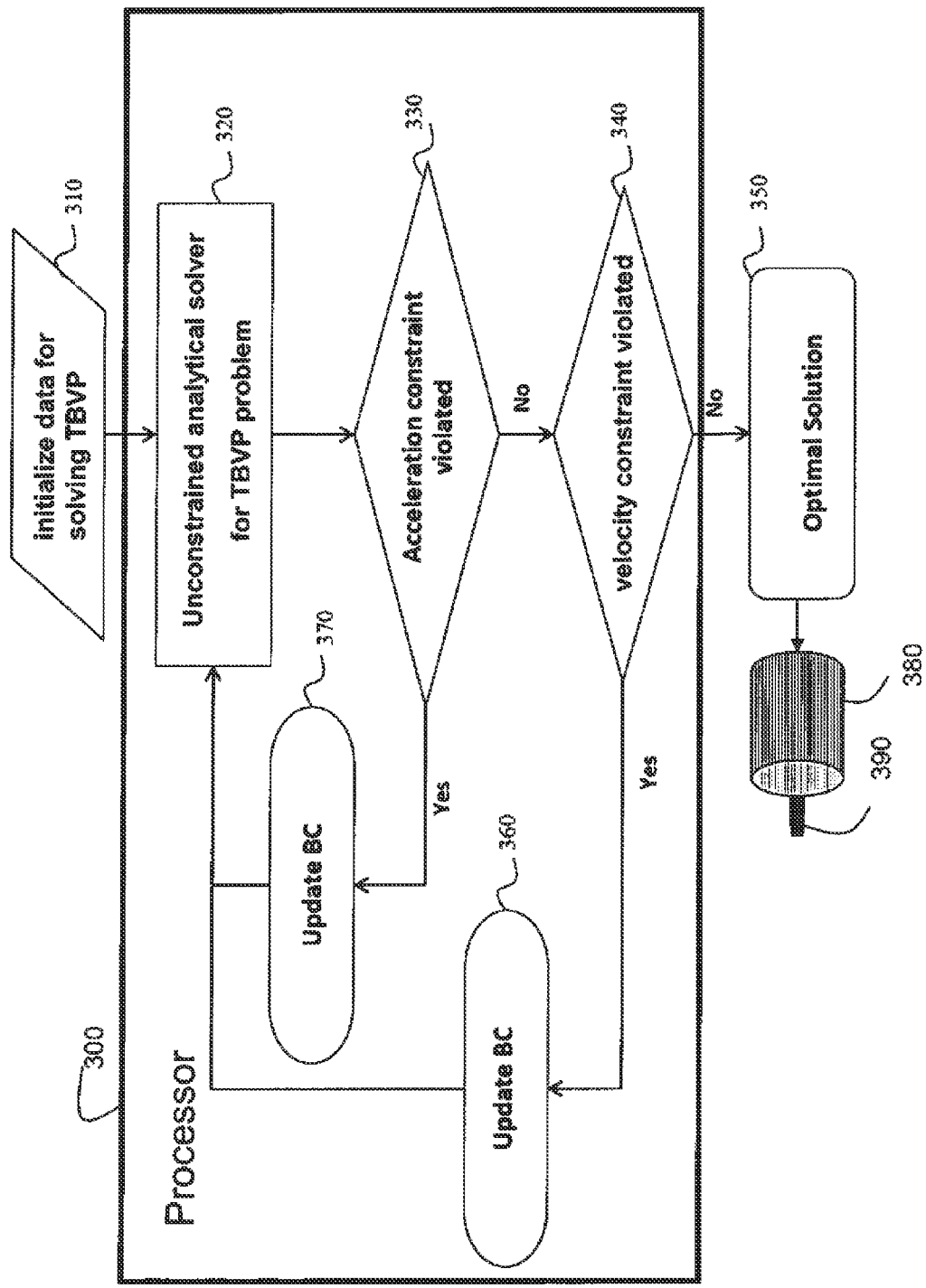
FIG. 3 is a flow chart of a method for generating trajectory of a motor controlled actuators subject to acceleration and velocity constraints according to embodiments of the invention.

FIG. 3 shows a method for generating trajectories for motor controlled actuators subject to dynamics, acceleration and velocity constraints according to embodiments of our invention.

The method can be performed in a processor 300 connected to a memory and input/output interfaces as known in the art. The method considers energy consumption of a motor motion control system due to resistive loss of the motor, and mechanical work. Although the example motor is rotational, other motors, such as linear motors can also be used with the invention.

Step 310 initializes all data for solving a two-point boundary value problem (TBVP), including parameters for a motor model and a positioning task. The data are input to the method 310.

Step 320 solves the TBVP using the data and an analytical solver for unconstrained motor optimal control subject to the boundary conditions, as described in greater detail below.

Step 330 identifies any violations of an acceleration constraint, and if true, then step 370 updates the boundary conditions, and iterates beginning at step 320.

Step 340 identifies any violations of a velocity constraint, and if true, then step 360 updates the boundary conditions, and iterates beginning at step 320. velocity constraint is violated to update the BC and repeat step 320.

Otherwise, step 350 sets the trajectory of the actuator 390 of the motor 38 to the solution of the TBVP if the acceleration constraint and the velocity constraint are satisfied.

Energy Efficient Motor Control Problem with an Optimal Control Formulation

The lumped inertia of a load and a motor is I, and a torque constant of the motor is $K_t$. We define $d=\bar{d}/I$, and $b=k_t/I$, where $\bar{d}$ is a viscous friction coefficient, $\bar{c}$ is Coulomb friction. An angular position of the motor is x, and an angular velocity v is the time derivitive of x. The input current to the motor is u. The motor dynamics are $$\dot{x}=v, \quad (1)$$

$$\dot{v}=-dv-c+bu. \quad (2)$$

The motion for the motor satisfies the velocity and acceleration constraints, which are $$v \leq v_{max}, \quad (3)$$

$$A_{min} \leq -dv-c+bu \leq A_{max}, \quad (4)$$

where $v_{max}$ is maximum allowable velocity, $A_{min}$ and $A_{max}$ are bounds on system acceleration with $$A_{min}<0 \text{ and } A_{max}>0.$$

The energy consumption of the motor is affected by many factors such copper loss (heat produced by electrical currents in the motor windings), iron loss (magnetic energy dissipated when the magnetic field is applied to the stator core of the motor), and mechanical work (friction in the motor). An instantaneous power of the motor consider these factors is $$P(v,u)=Ru^2+K_h|v||u|^\gamma+K_s|u|+K_tvu, \quad (5)$$

where R is the resistance of the motor, $K_h$ are hysteresis losses, $\gamma$ is a constant for the hysteresis loss, $K_s$ is a constant related to the switching loss, and $K_t$ is a torque ratio. When P is negative, the motor becomes a generator converting mechanical work into electricity by braking. This electricity is dissipated. Hence, the total energy consumption of a motor during a time period $[o, t_f]$ is $$E = \int_0^{t_f} Q(v(t), u(t))dt, \quad (6)$$

where Q(v(t),u(t)) is the power function given by $$Q(v(t),u(t))=\max\{0,P(v,u)\}.$$

The minimal energy motor control is given by the solution to the following optimal control problem:

Problem 1. Minimal Energy Motor Control $$\min_u E = \int_0^{t_f} Q(v, u)dt$$

$$\text{s.t. } \dot{x} = v,$$

$$\dot{v} = -dv - c + bu,$$

$$v \leq v_{max},$$

$$A_{min} \leq -dv - c + bu \leq A_{max},$$

$$x(0) = 0, x(t_f) = x_f,$$

$$v(0) = 0, v(t_f) = v_f.$$

The BC can be different for different cases such that x(0) and v(0) are not necessarily zero. However, they are set as zeros to simplify the notation. Because the positive rotational direction of the motor can be arbitrarily assigned, without loss of generality, it is assumed that $x_f > 0$.

Cost Function Simplification

The optimal control problem, such as Problem 1, can be solved faster with the appropriate simplified cost function. A method for cost function simplification is described below.

Problem 1 with power function of Eqn. (5) is first solved via a numerical optimization using a density function based mesh refinement process. A total of sixty-four cases with different execution time (or, final time) $t_f$ and final position $x_f$ were solved. The contribution of different terms in (5) are analyzed.

Specifically, the following quantities $$\frac{1}{E}\int_\Gamma Ru^2 dt, \frac{1}{E}\int_\Gamma K_h|x_2||u|^\gamma dt, \frac{1}{E}\int_\Gamma K_s|u|dt, \frac{1}{E}\int_\Gamma |K_t x_2 u| dt$$

are determined for all test cases and compared. The result shows that the copper loss term $r_u^2$ dominates the other terms when the average velocity of the position transit, i.e., $x_f/t_f$, is small. When $x_f/t_f$ is large, the mechanical work term $K_t vu$ dominates the others. This indicates that a simplified cost function including the copper loss and the mechanical work of the motor is a good approximation of the original cost function with the power determined by Eqn. (5).

To evaluate the optimality of the result using the simplified cost function, the following power functions are used to determine the optimal trajectory via numerical optimization:

$Q_A(x,u) = Ru^2 K_h|x_2||u|^\gamma + K_s|u| + K_t x_2 u,$ $Q_B(x,u) = Ru^2 K_h|x_2||u| + K_s|u| + K_t x_2 u,$ $Q_C(x,u) = Ru^2 + K_s|u| + K_t x_2 u,$ $Q_D(x,u) = Ru^2 + K_t x_2 u,$ $Q_E(x,u) = Ru^2,$ $Q_F(x,u) = \max\{0, Ru^2 + K_t x_2 u\}.$ The baseline cost $J_b = [J_{b1}, \ldots, J_{b64}]$ is used for comparing the loss of optimality when simplified power functions are used for optimization. This baseline cost is obtained by solving Problem 1 with the actual power function $Q(v, u)$ using the numerical optimization approach for all 64 cases. The adaptive mesh scheme is applied for better accuracy. With each of the power functions $Q_A$ to $Q_F$, Problem 1 is also solved via numerical optimization for all 64 cases.

The relative cost error for the $i^{th}$ case is estimated by $$\Delta \bar{J}_i = \frac{J_i - J_{bi}}{J_{bi}},$$

and for each cost function, the vector of relative cost error $\Delta \bar{J}$, the computation time $T_{cpu}$, and the final position error $e_f$ for all 64 cases are evaluated using the $L_1$ norm, which gives an average measure, and an $L_\infty$ norm, which describes the worst case.

TABLE 1

Numerical result comparison with different power functions for cost function simplification

| Power | $\|\Delta \bar{J}\|_1$ | $\|\Delta \bar{J}\|_\infty$ | $\|T_{cpu}\|_1$ | $\|T_{cpu}\|_\infty$ | $\|e_f\|_1$ | $\|e_f\|_\infty$ |
|---|---|---|---|---|---|---|
| $Q_A$ | 0.61% | 1.5% | 3.0 s | 5.2 s | 0.14% | 0.60% |
| $Q_B$ | 0.54% | 1.3% | 2.8 s | 5.4 s | 0.15% | 0.66% |
| $Q_C$ | 1.0% | 2.6% | 2.4 s | 4.6 s | 0.15% | 0.52% |
| $Q_D$ | 1.9% | 4.2% | 1.6 s | 4.8 s | 0.08% | 0.42% |
| $Q_E$ | 2.8% | 7.1% | 1.6 s | 5.1 s | 0.06% | 0.15% |
| $Q_F$ | 0.28% | 1.6% | 3.8 s | 5.4 s | 0.14% | 0.56% |

According to the numerical optimization result listed in Table 1, the numerical optimization approach using direct transcription takes 1.6 to 5.6 seconds to solve the problem, which is too slow for real time motor control applications.

Therefore, power functions used to solve Problem 1 analytically are more suitable for applications. Such power functions include $Q_D$ and $Q_E$. Because the power function $Q_D$ provides acceptable optimality as compared to the true cost function, and can be solved analytically, it is used to determine the energy consumption cost function as $$E = \int_0^{t_f} Q_D(v, u) dt = \int_0^{t_f} (Ru^2 + K_t vu) dt. \quad (7)$$

Analytic Solution to the TBVP for the Unconstrained Case

In this section we present the analytical solution to Problem 1 using the simplified cost function (7) without velocity and acceleration constraints. The optimal solution for this case is given by the following problem:

Problem 2. Unconstrained Minimal Energy Motor Control with Simplified Cost Function A description of the problem to minimize the energy can be formulated as follow:

$$\min_u E = \int_0^{t_f} (Ru^2 + K_t vu) dt$$

s.t. $\dot{x} = v,$ $\dot{v} = -dv - c + bu,$ $x(0) = 0, x(t_f) = x_f,$ $v(0) = 0, v(t_f) = v_f.$ Problem 2 is a linear system optimal control problem with quadratic cost, therefore, it can be solved analytically. The Hamiltonian for Problem 2 is given by $H = Ru^2 + K_t vu + \lambda_x v + \lambda_v(-dv + bu - c),$ where $\lambda_x$ and $\lambda_v$ are the co-states for x and v dynamics, respectively. According to optimal control theory, the dynamics of the co-states are $$\dot{\lambda}_x = -\frac{\partial H}{\partial x} = 0, \quad (8)$$

$$\dot{\lambda}_v = -\frac{\partial H}{\partial v} = d\lambda_v - K_t u - \lambda_x. \quad (9)$$

Note that $\lambda_x$ is constant according to Eqn. (8). The optimal control u* is determined from the first-order optimality condition $\partial H/\partial u = 0$, which yields $$u^* = -\frac{K_t}{2R}v - \frac{b}{2R}\lambda_v. \quad (10)$$

Bringing the expression of optimal control in Eqn. (10) into Eqns. (8-9), we have the following Two-point Boundary Value Problem (TBVP):

Two-Point Boundary Value Problem (TBVP) for Unconstrained Motor Control

The TBVP can be formulated as:

$$\dot{x} = v,$$
$$\dot{v} = -\left(d + \frac{bK_t}{2R}\right)v - \frac{b^2}{2R}\lambda_v - c,$$
$$\dot{\lambda}_v = -\frac{\partial H}{\partial v} = d\lambda_v - K_t u - \lambda_x,$$

with unknown parameter $\lambda_x$ and boundary conditions $x(0)=0, x(t_f)=x_f,$ $v(0)=0, v(t_f)=0, \lambda_v(0)$ and $\lambda_v(t_f)$ free.

Let $$A_1 = -\left(d + \frac{bK_t}{2R}\right),$$
$$A_2 = -\frac{b^2}{2R},$$
$$A_3 = \frac{K_t^2}{2R},$$

and define $$A = \begin{bmatrix} 0 & 1 & 0 \\ 0 & A_1 & A_2 \\ 0 & A_3 & -A_1 \end{bmatrix},$$

$$B = \begin{bmatrix} 0 \\ -c \\ -\lambda_x \end{bmatrix},.$$

Then the differential equations in the TPBV can be written more compactly as $$\begin{bmatrix} \dot{x} \\ \dot{v} \\ \dot{\lambda}_v \end{bmatrix} = A \begin{bmatrix} x \\ v \\ \lambda_v \end{bmatrix} + B \quad (11)$$

The solution to linear system (11) is given by $$\begin{bmatrix} x(t) \\ v(t) \\ \lambda_v(t) \end{bmatrix} = e^{At} \begin{bmatrix} x(0) \\ v(0) \\ \lambda_v(0) \end{bmatrix} + e^{At}\int_0^t e^{-A\tau} B d\tau \quad (12)$$

$$= M(t) \begin{bmatrix} x(0) \\ v(0) \\ \lambda_v(0) \end{bmatrix} + G(t)B,$$

where $M(t) = e^{At} \in \mathbb{R}^{3\times 3}$, and $G(t) \in \mathbb{R}^{3\times 3}$ is given by $$G(t) = e^{At}\int_0^t e^{-A\tau}d\tau.$$

The BC of the TBVP satisfies Eqn. (12) with $t=t_f$ $$\begin{bmatrix} x_f \\ v_f \\ \lambda_{vf} \end{bmatrix} = M(t_f) \begin{bmatrix} x_0 \\ v_0 \\ \lambda_{v0} \end{bmatrix} + G(t_f)B, \quad (13)$$

from which the unknowns $\lambda_{v0}, \lambda_{vf},$ and $\lambda_x$ can be solved. After these unknowns are solved, the optimal state and co-state histories can be determined from Eqn. (12), and the optimal control is given by Eqn. (10).

Method for Solving the MBVP with Active Acceleration Constraint

Next we describe a method for determining the optimal solution to Problem 2 subject to acceleration constraints.

Problem 3. Acceleration Constrained Minimal Energy Motor Control with Simplified Cost Function $$\min_u E = \int_0^{t_f}(Ru^2 + K_t vu)dt$$
$$\text{s.t.} \quad \dot{x} = v,$$
$$\dot{v} = -dv - c + bu,$$
$$A_{min} \le -dv - c + bu \le A_{max},$$
$$x(0) = 0, x(t_f) = x_f,$$
$$v(0) = 0, v(t_f) = v_f.$$

In the above description, the term $A_{min} \le -dv-c+bu \le A_{max}$ is the acceleration constraint 320.

The analytical result for the TBVP indicate that the control solution to Problem 2 is positive at the beginning for accelerating the motor, then negative for deceleration. $\dot{v}$ is larger around $t=0$ and $t=t_f$. For a given final position $x_f$, when the final time $t_f$ is large enough, the acceleration constraints are not activated. As $t_f$ decreases, it requires faster acceleration at the beginning and deceleration at the end such that the motor move over the same distance within a shorter time. When $t_f$ is small enough, the acceleration constraints can be activated around $t=o$ and $t=t_f$.

When the acceleration constraints are activated, the optimal solution exhibits a three phase structure: maximum acceleration, unconstrained optimal solution (analytical solution), and minimal deceleration. In the first and third phases, the position and velocity of the motor are determined explicitly by $$v_l(t) = A_{max}t,$$

$$x_l(t) = \frac{1}{2}A_{max}t^2,$$

$$v_r(t) = A_{min}(t - t_f),$$

$$x_l(t) = x_f + \frac{1}{2}A_{min}(t - t_f)^2.$$

In the second phase, because the acceleration constraints are inactive, the optimal solution during this phase is given by the analytic solution to Problem 2 with BC $$x_m(t_1^*)=x_l(t_1^*), v_m(t_1^*)=v_l(t_1^*), x_m(t_2^*)=x_r(t_2^*), v_m(t_2^*)=v_r(t_2^*),$$

where $t_1^*$ and $t_2^*$ are the optimal switching times from an acceleration constrained arc ($\dot{v}=A_{max}$) to an unconstrained arc, and from an unconstrained arc to a deceleration constrained arc ($\dot{v}=A_{min}$), respectively, and $x_m$ and $v_m$ are the optimal position and velocity solution for the second phase.

Figure 4:
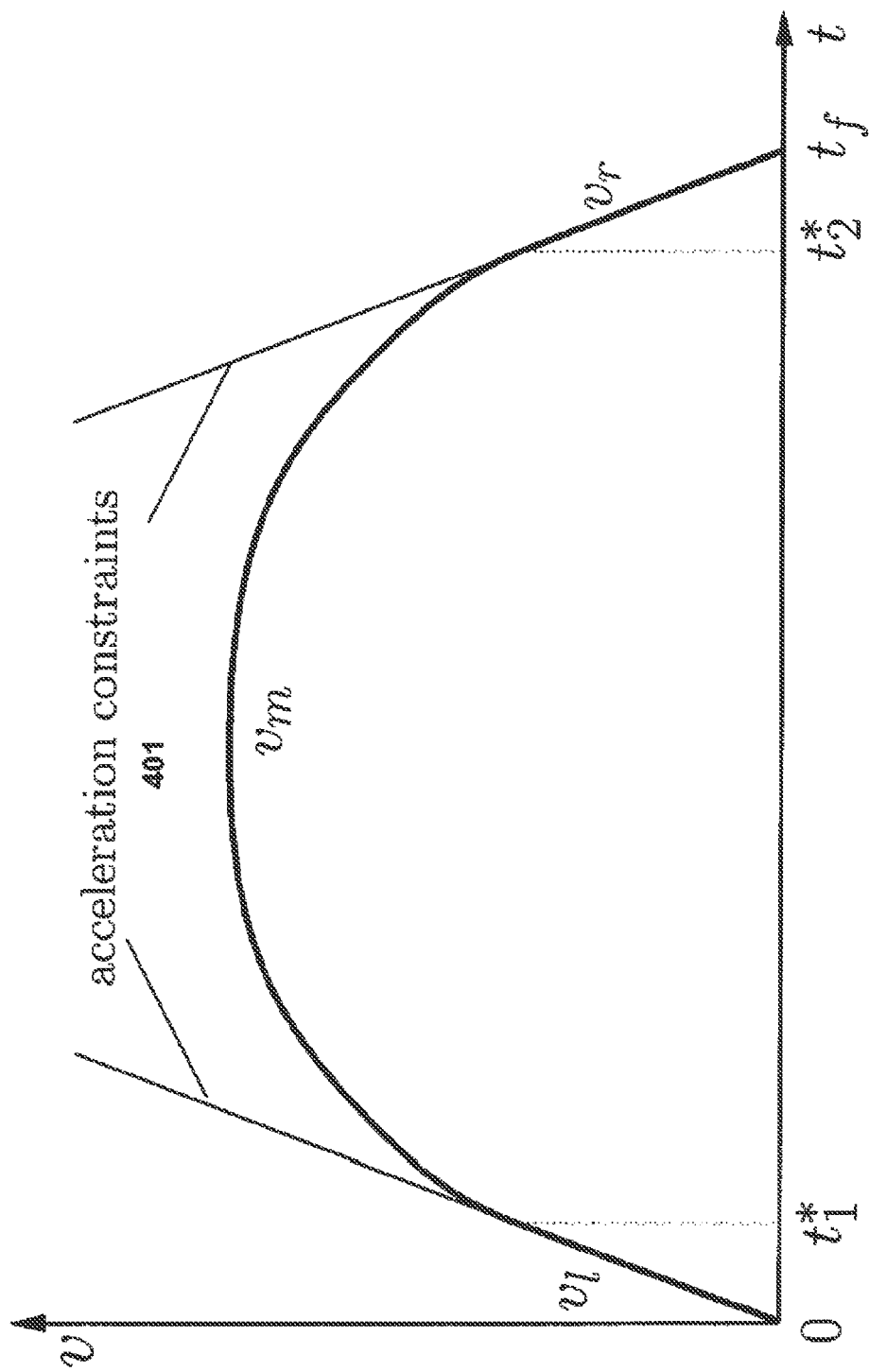
FIG. 4 is a graph of a velocity profile when the acceleration constraint is saturated according to embodiments of the invention.

FIG. 4 shows the optimal velocity solution with a tangential condition 401 on the analytical solution.

The optimal control u* for Problem 2 is continuous according to the optimal control theory. This further implies that the derivative of the optimal velocity is continuous. Hence, the junction conditions at the optimal switching times $t_1^*$ and $t_2^*$ are described by two tangent conditions $$\dot{v}_l(t_1^*)=\dot{v}_m(t_1^*), \dot{v}_r(t_2^*)=\dot{v}_m(t_2^*).$$

Therefore, the solution to the acceleration constrained energy optimal motor control problem is determined from the following system of equations which form the MBVP:

$$\begin{bmatrix} x_m(t_2^*) \\ v_m(t_2^*) \\ \lambda_v(t_2^*) \end{bmatrix} = M(t_2^* - t_1^*) \begin{bmatrix} x_m(t_1^*) \\ v_m(t_1^*) \\ \lambda_v(t_1^*) \end{bmatrix} + G(t_2^* - t_1^*) \begin{bmatrix} 0 \\ -c \\ -\lambda_x \end{bmatrix},$$

$$\dot{v}_m(t_1^*) = [0 \ 1 \ 0]\left( AM(0) \begin{bmatrix} x_m(t_1^*) \\ v_m(t_1^*) \\ \lambda_v(t_1^*) \end{bmatrix} + G(0) \begin{bmatrix} 0 \\ -c \\ -\lambda_x \end{bmatrix} \right) - c,$$

$$\dot{v}_m(t_2^*) = [0 \ 1 \ 0]\left( AM(t_2^* - t_1^*) \begin{bmatrix} x(t_1^*) \\ v(t_1^*) \\ \lambda_v(t_1^*) \end{bmatrix} + G(t_2^* - t_1^*) \begin{bmatrix} 0 \\ -c \\ -\lambda_x \end{bmatrix} \right) - c,$$

$$\dot{v}_l(t_1^*) = \dot{v}_m(t_1^*),$$

$$\dot{v}_r(t_2^*) = \dot{v}_m(t_2^*),$$

$$v_m(t_1^*) = v_l(t_1^*),$$

$$v_m(t_2^*) = v_r(t_2^*),$$

$$x_l(t_1^*) = x_m(t_1^*),$$

$$x_r(t_2^*) = x_m(t_2^*).$$

The analytic expression for the first and third phases of optimal solution has been applied in the above MBVP for simplification, hence the BC for these phases are automatically satisfied. There are a total of nine equations and nine unknowns $$\lambda_x, t_1^*, t_2^*, x_m(t_1^*), v_m(t_1^*), \lambda_v(t_1^*), x_m(t_2^*), v_m(t_2^*), \lambda_v(t_2^*),$$

therefore the MBVP is solvable. However, the whole system is nonlinear and no analytic solution can be found for the MBVP. Besides, there is no guarantee that the current numerical method can solve this problem. Solving such a system of equations is also time-consuming.

Because velocity and reliability are crucial for the real-time application of optimal motor control, we describe a method for solving Problem 3. The optimal switching times $t_1^*$ and $t_2^*$ are solved by identifying the optimal velocity profiles $v_k$ for an unconstrained minimal energy control problems.

Figure 5:
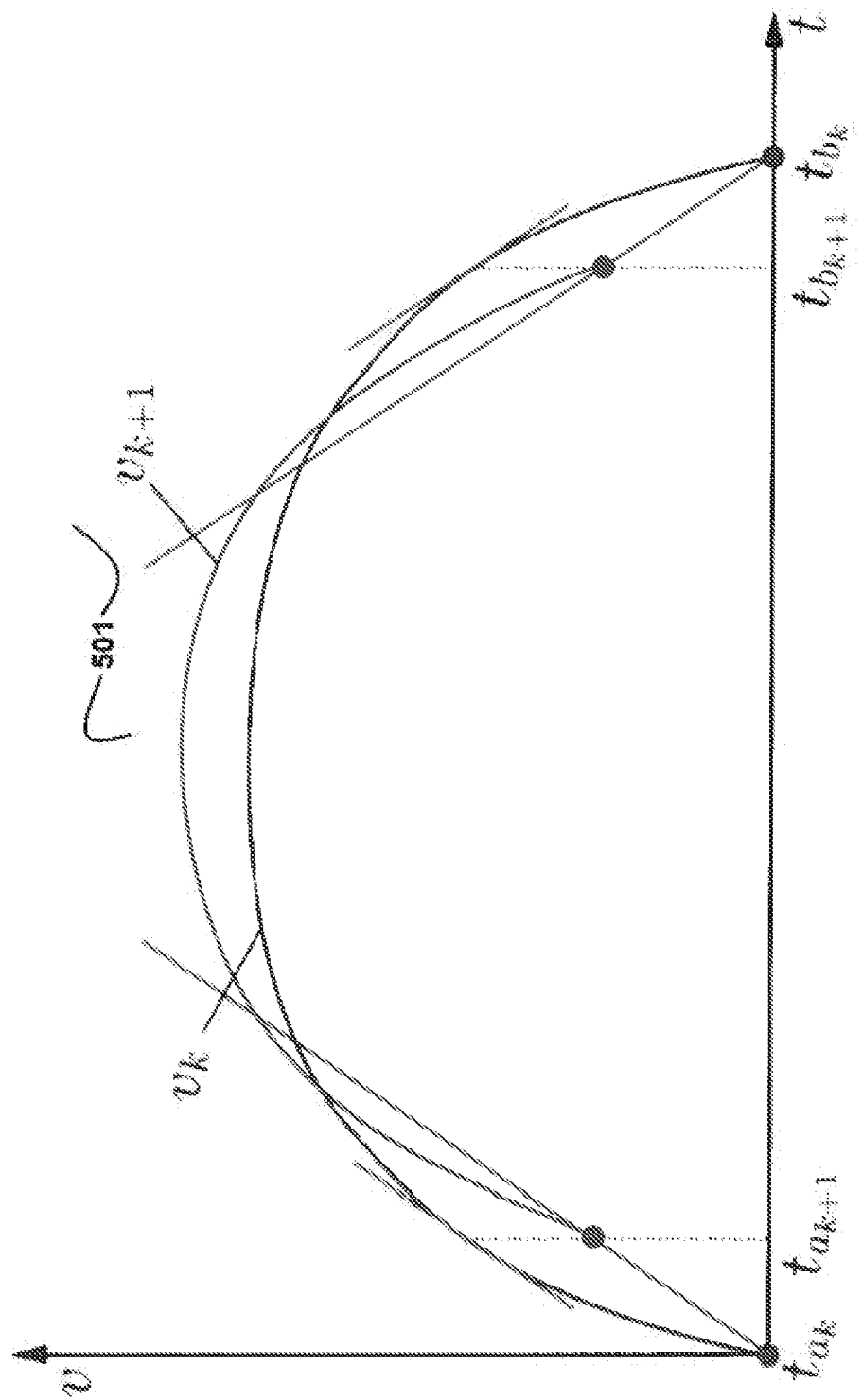
FIG. 5 is a graph of two subsequent updates of switching time estimations for acceleration constraints according to embodiments of the invention.

FIG. 5 shows the updates at times $t_{a_k}$, $t_{b_k}$, which are approximations of $t_1^*$ and $t_2^*$, and the unconstrained optimal velocity profiles $v_k$ 501

Figure 6:
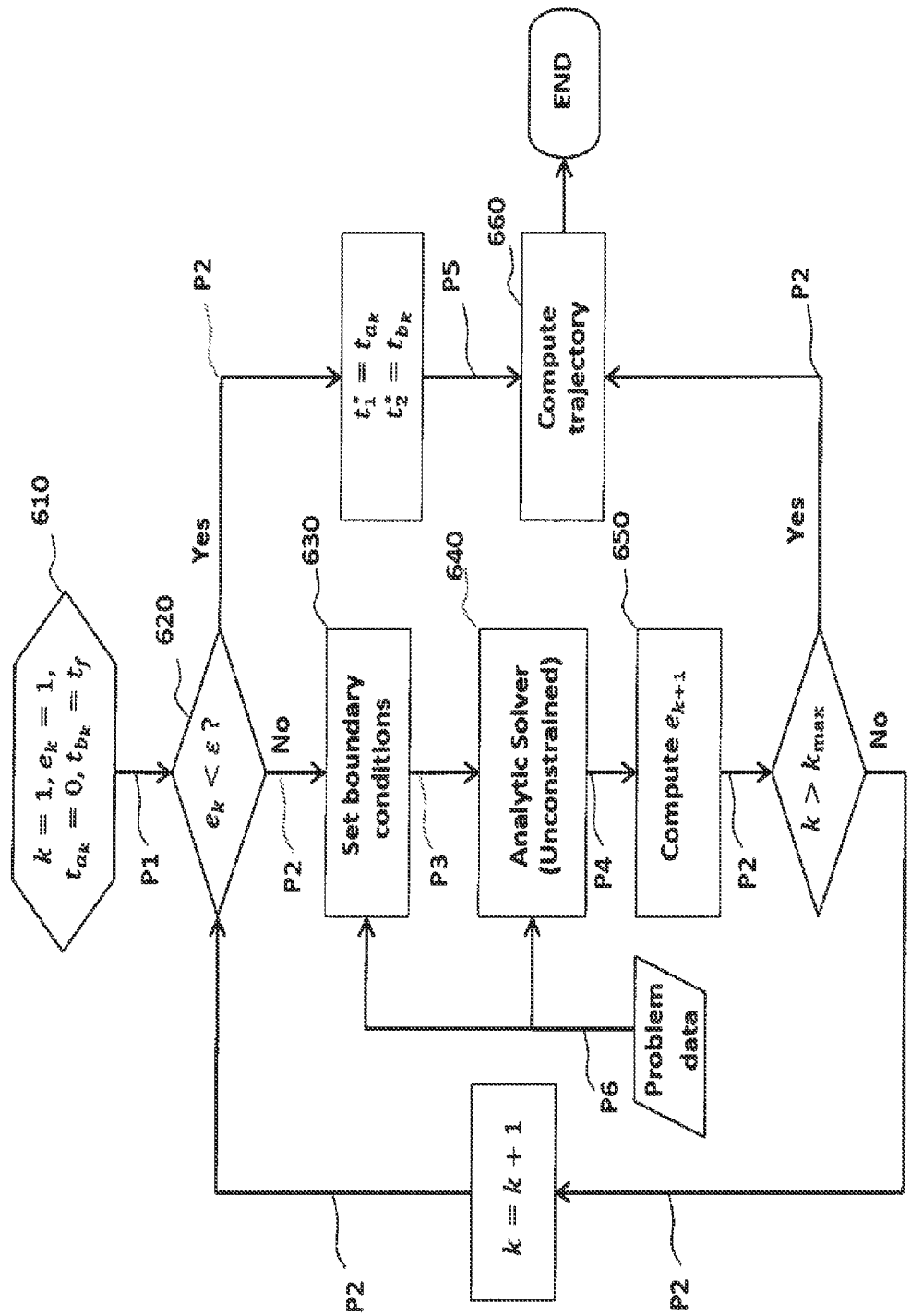
FIG. 6 is a flowchart of a method for generating trajectory of a motor controlled actuators subject to an acceleration constraint according to embodiments of the invention.

FIG. 6 shows the method steps detailed in the table below. This method is presented by flow chart FIG. 6. The detailed description can be found in Table 2, and the parameters in Table 3.

The steps in FIG. 6 are described in detail in Table 2 below:
Detailed Description Step 610 Initialize the solver for Problem 3 by setting $e_k$=1, where $0<\epsilon<<1$ is the tolerance parameter deciding the accuracy of the final solution. Let k=1, and choose $k_{max}$, which limits the total number of iterations in the solver. Choose the switch time for acceleration constraints $t_{a_k}$=0 and $t_{b_k}$=0.

620 Determine whether the stopping criteria is met. If $e_k<\epsilon$, let $t_1^*=t_{a_k}$, $t_2^*=t_{b_k}$, and go to step S6. Otherwise go to step S3.

630 Set up the BC for the analytic solver with $x_o=x_l(t_{a_k})$, $v_o=v_l(t_{a_k})$ at the initial time t=0, and $x_f=x_r(t_{b_k})$, $v_f=v_r(t_{b_k})$ at the final time $t=t_{b_k}-t_{a_k}$.

640 Solve the TBVP using the specified BC set up in S3. Specifically, solve equation (13) for unknown parameters $\lambda_v(t_{a_k}), \lambda_v(t_{b_k})$, and $\lambda_x$. The matrices in (13) are determined using the problem data.

650 Update the switch time by solving equations $$\dot{v}(t_{a_{k+1}})=A_{max}, \dot{v}(t_{b_{k+1}})=A_{min}.$$

For $t_{a_{k+1}}$ and $t_{b_{k+1}}$. These equations are solved using a standard Newton's method with updated bounds on the switching time. Determine the error as $e_{k+1}=|t_{a_{k+1}}-t_{a_k}|+|t_{b_{k+1}}-t_{b_k}|$.

660 Determine the optimal solution as $$x^*(t) = \begin{cases} x_l(t), & t \in [0, t_1^*], \\ x(t-t_1^*), & t \in [t_1^*, t_2^*], \\ x_r(t) & t \in [t_2^*, t_f]. \end{cases}$$

$$v^*(t) = \begin{cases} v_l(t), & t \in [0, t_1^*], \\ v(t-t_1^*), & t \in [t_1^*, t_2^*], \\ v_r(t) & t \in [t_2^*, t_f]. \end{cases}$$

$$u^*(t) = \begin{cases} (A_{max}+dv_l(t)+c)/b, & t \in [0, t_1^*], \\ u(t-t_1^*), & t \in [t_1^*, t_2^*], \\ (A_{min}+dv_r(t)+c)/b, & t \in [t_2^*, t_f]. \end{cases}$$

Where (x,v,u) is the optimal solution to the TBVP as given by equation (12).

TABLE 3

Detailed description of parameters in flow charts

| label | Detailed description of the parameters |
|---|---|
| P1 | P1 plus includes $e_k$, k, $t_{a_k}$ and $t_{b_k}$. $e_k$ is the switch time error of the k-th iteration; k is the number of iterations; $t_{a_k}$ and $t_{b_k}$ are the approximated switch time corresponding to $t_1^*$ and $t_2^*$. |

TABLE 3-continued

Detailed description of parameters in flow charts

| label | Detailed description of the parameters |
|---|---|
| P2 | If k = 1, then P2 is identical to P1. Otherwise, P2 includes P1 plus $\lambda_v(t_{a_k}), \lambda_v(t_{b_k}), \lambda_x$. |
| P3 | P3 includes P1 plus the BC for the analytic solver (TBVP solver), which include the initial time $t_{a_k}$, the final time $t_{b_k}$, and $x(t_{a_k}) = x_1(t_{a_k}), x(t_{b_k}) = x_r(t_{b_k}), v(t_{a_k}) = v_1(t_{a_k}),$ $v(t_{b_k}) = v_r(t_{b_k})$. |
| P4 | P4 includes $t_{a_k}, t_{b_k}, \lambda_v(t_{a_k}), \lambda_v(t_{b_k}), \lambda_x, k, x(t_{a_k}),$ $x(t_{b_k}), v(t_{a_k}), v(t_{b_k})$. |
| P5 | P5 includes $t_1^*, t_2^*, \lambda_v(t_1^*), \lambda_v(t_2^*), \lambda_x, x(t_1^*), x(t_2^*), v(t_1^*),$ $v(t_2^*)$.<br>Note that $t_1^* = 0$ and $t_2^* = t_f$ if the acceleration constraints are satisfied. |
| P6 | P6 includes $\eta_i, i, \delta_i$.<br>$\eta_i$ is the error related to the accuracy of the solution.<br>i is the number of iterations.<br>$\delta_i$ is an approximation of the velocity constraint saturation time $t_4^* - t_3^*$. |
| P7 | P7 includes $\{\delta_i\}, i, x(0), x(\tau_f), v(0), v(\tau_f), \tau_f$. P7 also includes $\{\eta_i\}$ when i > 1. |
| P8 | P8 includes P7 plus $\lambda_v(0), \lambda_v(\tau_f), \lambda_x$. |
| P9 | P9 includes $\{\delta_i\}, \{\eta_i\}, i$. |
| P10 | P10 includes $x(0), x(\tau_f), v(0), v(\tau_f), \tau_f$. |
| P11 | P11 includes $\Delta_t^*, x(0), x(t_f - \Delta_t^*), v(0), v(t_f - \Delta_t^*), \lambda_v(0), \lambda_v(t_f - \Delta_t^*),$ $\lambda_x$. |
| P12 | P12 includes $(\tilde{x}^*(t), \tilde{v}^*(t), \tilde{u}^*(t)), t \in [0, t_f - \Delta_t^*]$, which is the optimal solution to Problem 1 without the state constraint $v \leq v_{max}$, with final position $x_f - \Delta_t^* v_{max}$, and final time $t_f - \Delta_t^*$. |

The above method above is guaranteed to generate the optimal solution for the acceleration constrained energy optimal motor control problem.

Method for Solving the MBVP with Active Velocity Constraint

Figure 7:
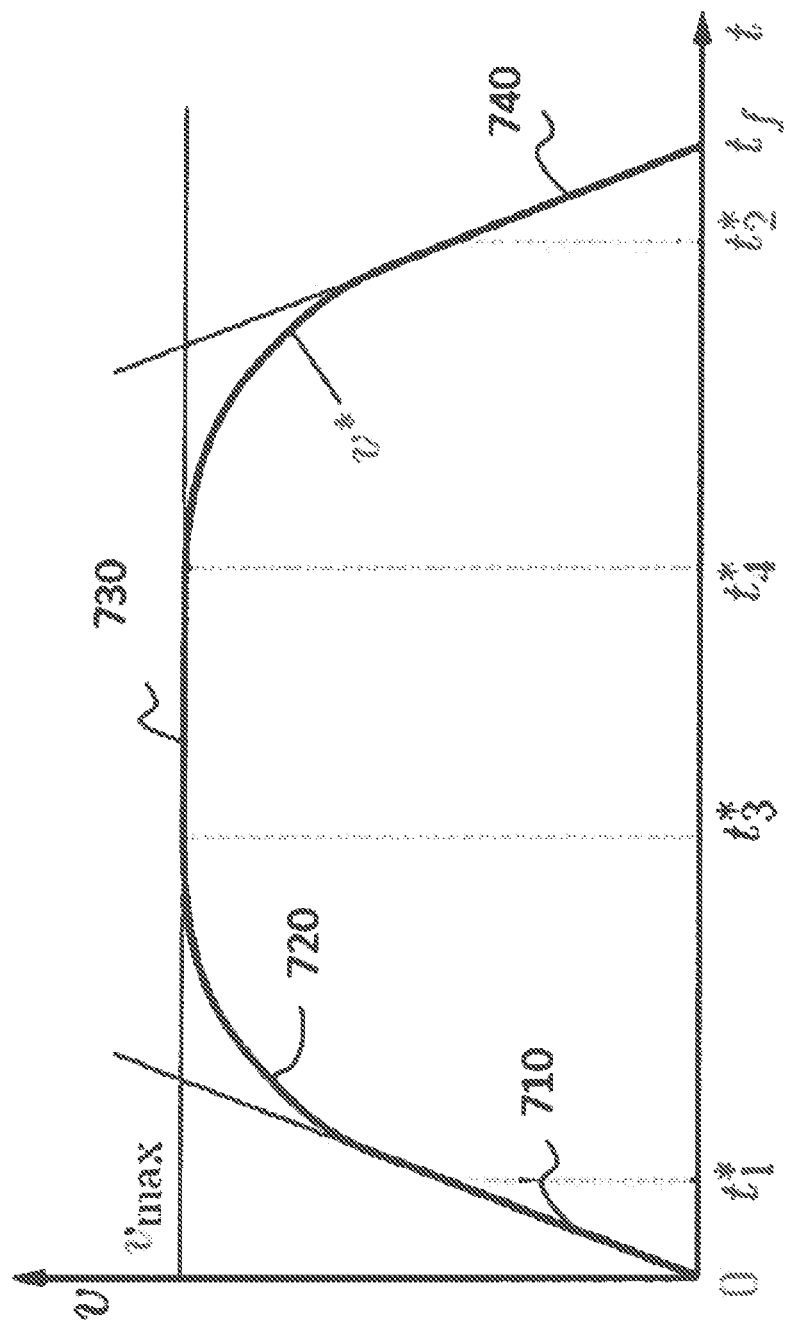
FIG. 7 is a graph of switching times of an energy optimal speed profile when the speed and the acceleration constraints are active according to embodiments of the invention.

Next, we describe a method for solving the energy optimal motor control problem when the velocity constraint is active. FIG. 7 shows different types of arcs in the optimal trajectory subject to acceleration constraints. Specifically, 710 is a acceleration constrained arc, 720 is an unconstrained arc, 730 is a speed constrained arc, and 740 is a deceleration constrained arc.

As shown in FIG. 7, when the velocity constraint is active in the optimal solution, the optimal velocity profile contains two switching times including $t_3^*$ and $t_4^*$. At $t_3^*$, the optimal velocity profile switches from unconstrained arc to $v=v_{max}$, while at $t_4^*$ the optimal velocity profile switches from $v=v_{max}$ back to unconstrained arc.

Similar to the acceleration constrained case, the optimal control approach for solving the velocity constrained case also leads to a MBVP, which is even more complicated and difficult to solve than that of the acceleration constrained case. Hence, we provide a method for solving the velocity constrained energy optimal motor control problem.

Let $(x^*, v^*, u^*)$ be the optimal solution to Problem 1 with final position $x_f$ and final time $t_f$. Suppose the state constraint $v \leq v_{max}$ is active on the interval $[t_3^*, t_4^*]$, such that $v \leq v_{ma}$ if and only if $t \in [t_3^*, t_4^*]$, where $t_3^*$ and $t_4^*$ are the optimal switch time entering and exiting the state constraint. Let $\Delta_t^* = t_4^* - t_3^*$, and let $(\tilde{x}^*, \tilde{v}^*, \tilde{u}^*)$ be the optimal solution to Problem 3 with final position $x_f - \Delta_t^* v_{max}$, and final time $t_f - \Delta_t^*$. Then $(x^*, v^*, u^*)$ and $(\tilde{x}^*, \tilde{v}^*, \tilde{u}^*)$ are related by $$\begin{cases} x^*(t) = \tilde{x}^*(t), \\ v^*(t) = \tilde{v}^*(t), t \in [0, t_3^*), \\ u^*(t) = \tilde{u}^*(t), \end{cases} \quad (14)$$

$$\begin{cases} x^*(t) = \tilde{x}^*(t_3^*) + v_{max}(t - t_3^*), \\ v^*(t) = v_{max}, t \\ u^*(t) = \frac{dv_{max} + c}{b}, t \in [t_3^*, t_4^*], \end{cases} \quad (15)$$

$$\begin{cases} x^*(t) = \tilde{x}^*(t - \Delta_t^*) + \Delta_t^* v_{max}, \\ v^*(t) = \tilde{v}^*(t - \Delta_t^*), t \in [t_4^*, t_f], \\ u^*(t) = \tilde{u}^*(t - \Delta_t^*), \end{cases} \quad (16)$$

Hence, if $\Delta_t^*$ is determined, then $(\tilde{x}^*, \tilde{v}^*, \tilde{u}^*)$ can be solved, from which $(x^*, v^*, u^*)$ can be determined using Eqns. (14-16).

The value $\Delta_t^*$ is decided from the condition that $$\max_t \tilde{v}^*(t) = v_{max},$$

or, equivalently, $$\tilde{v}^*(t)|_{\dot{v}(t)=0} = v_{max}.$$

Figure 8:
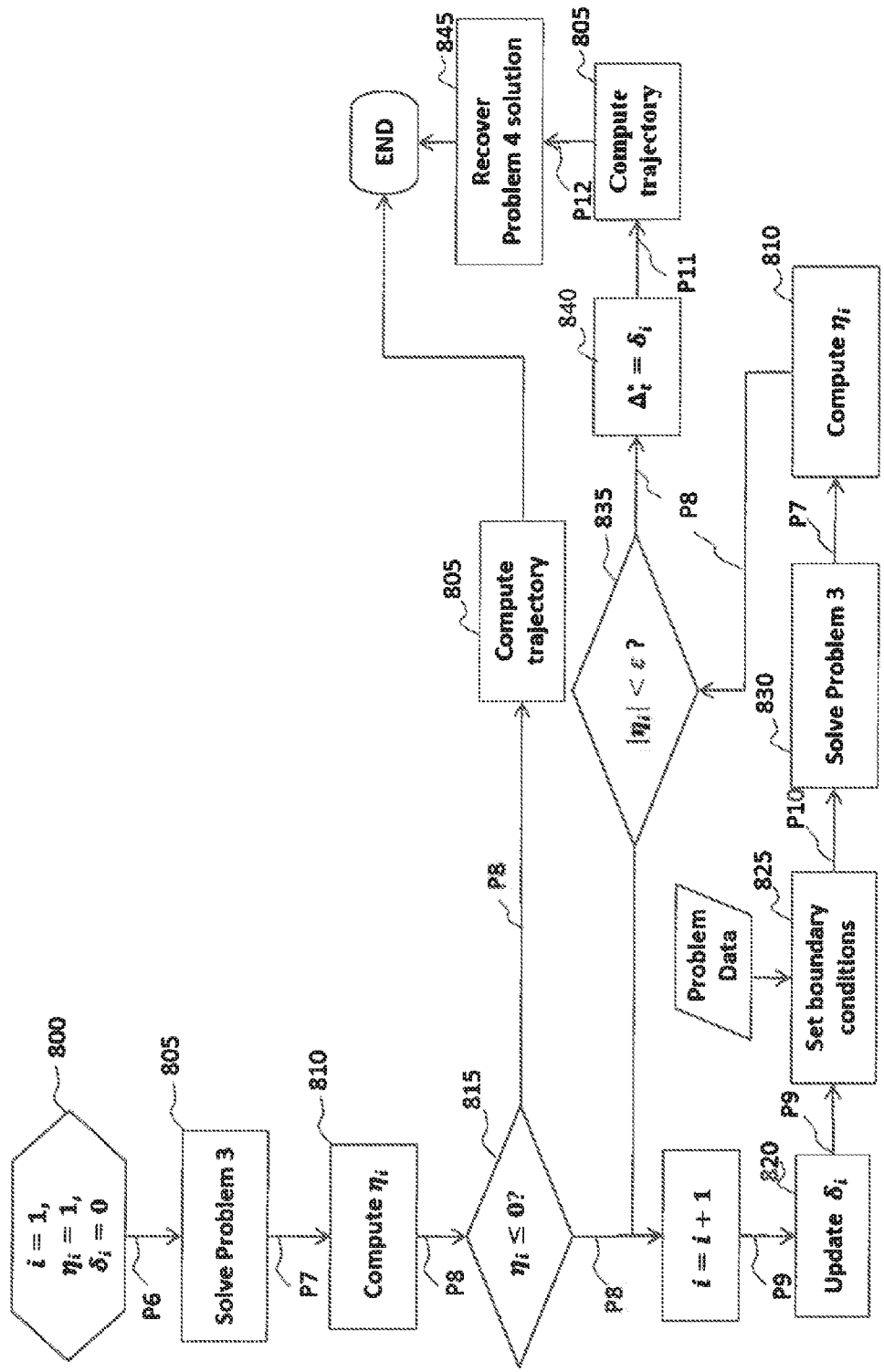
FIG. 8 is a flowchart of a method for generating trajectory of a motor controlled actuators subject to a velocity constraint according to embodiments of the invention.
Figure 9:
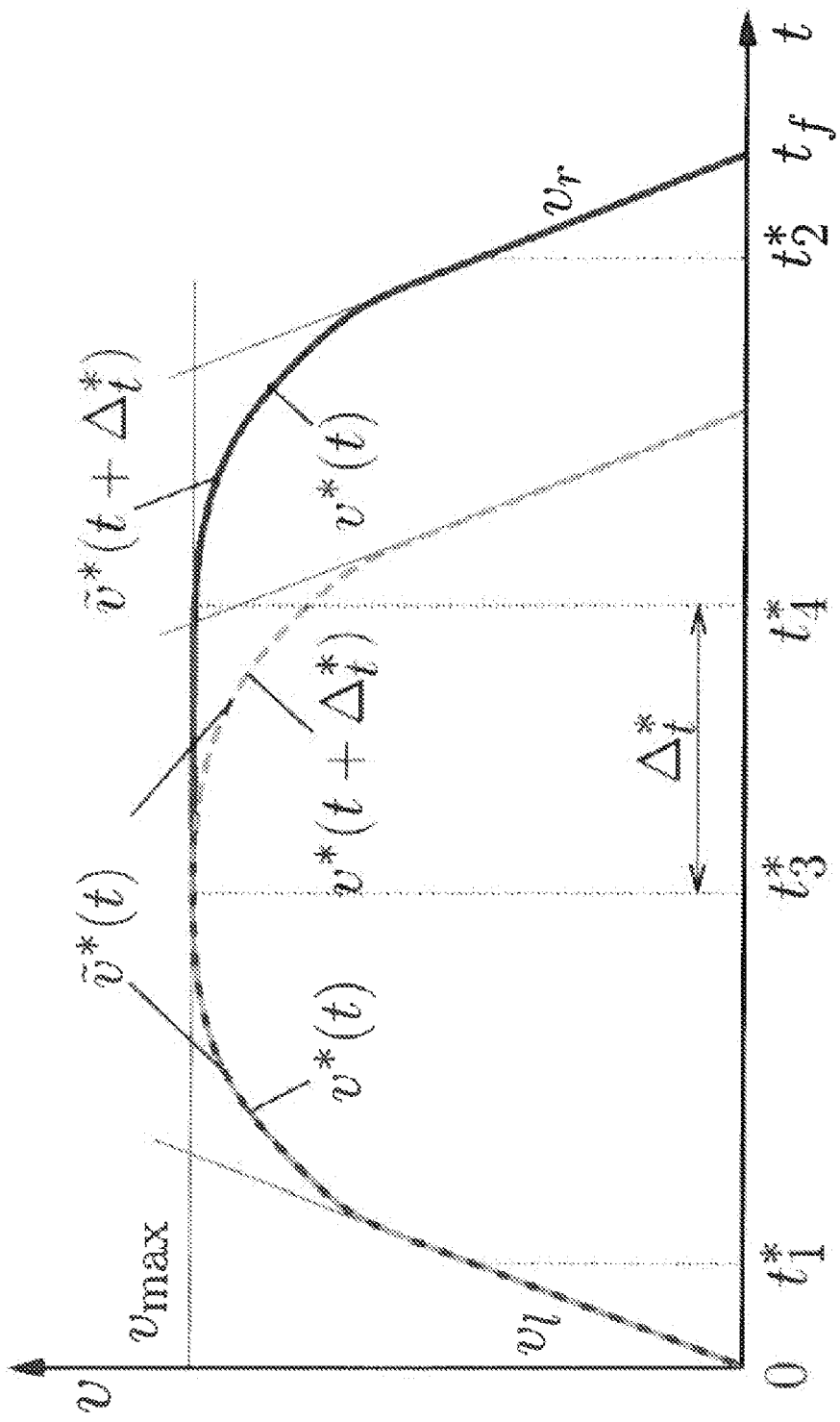
FIG. 9 is a graph of a partial equivalence between two different optimal control problems when a velocity constraint is active in an optimal velocity solution according to embodiments of the invention.
Figure 10A:
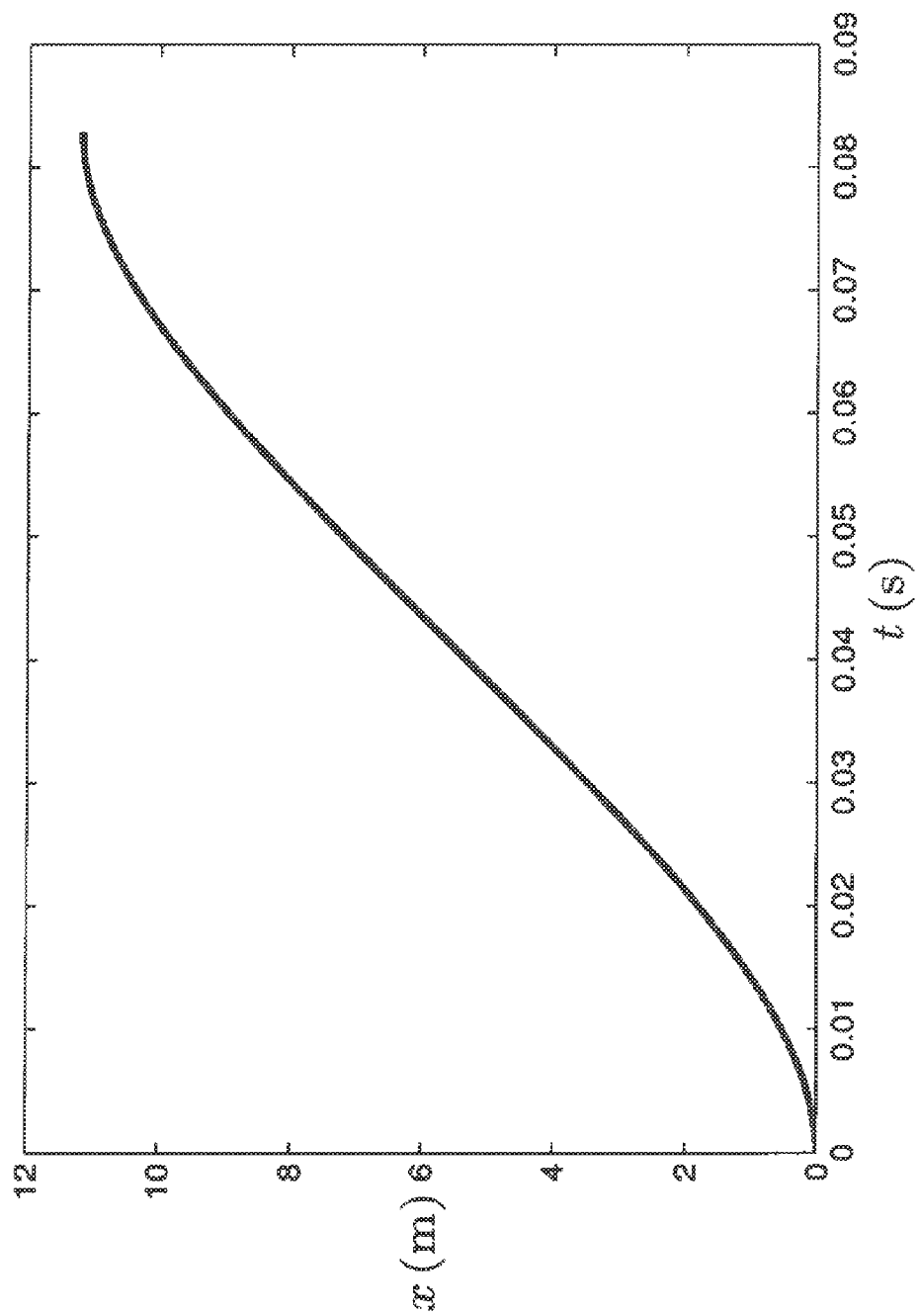
FIG. 10A-10C are graphs of energy efficient motor control position, velocity, and control input profiles, respectively, for a case without active acceleration or velocity constraint according to embodiments of the invention.
Figure 10B:
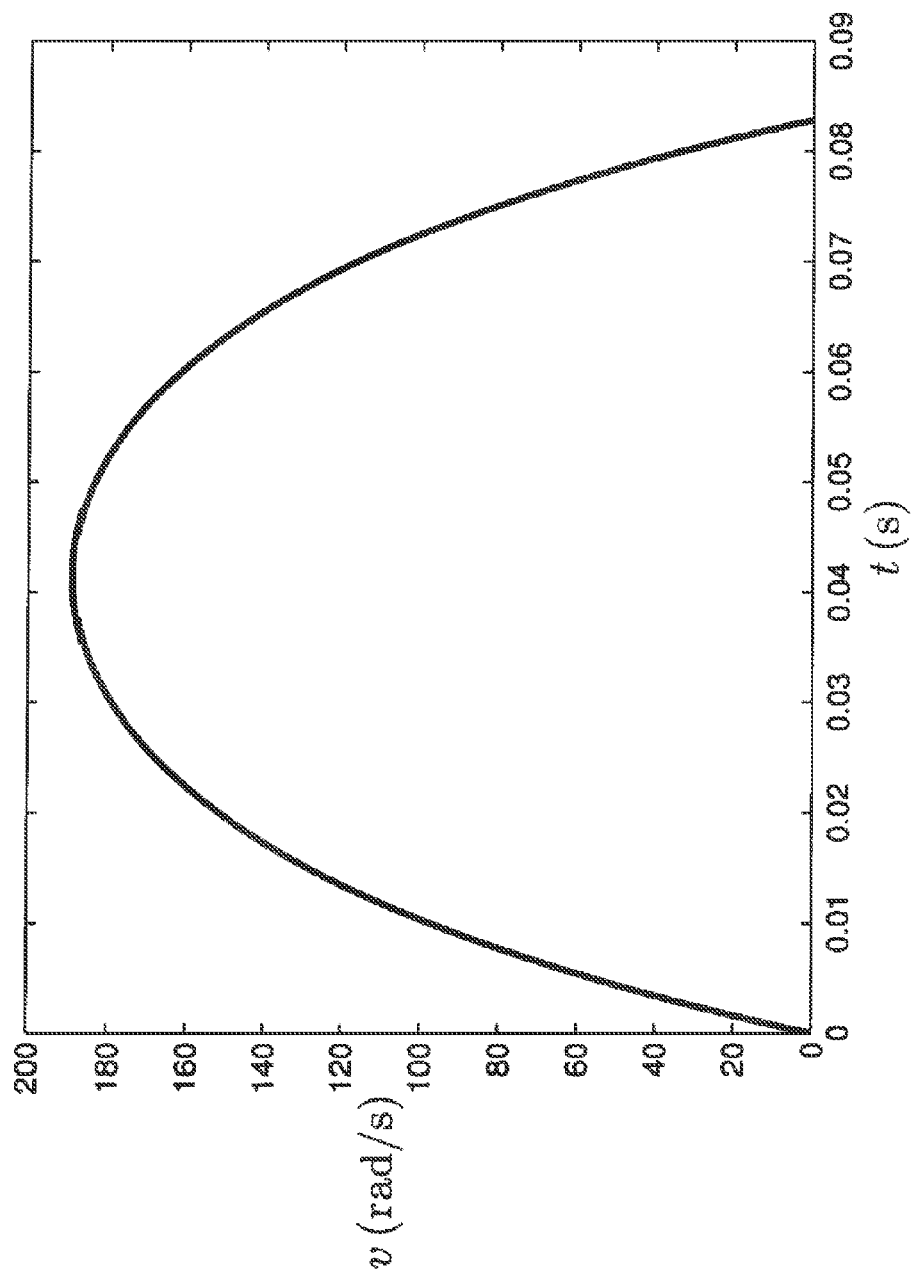
Figure 10C:
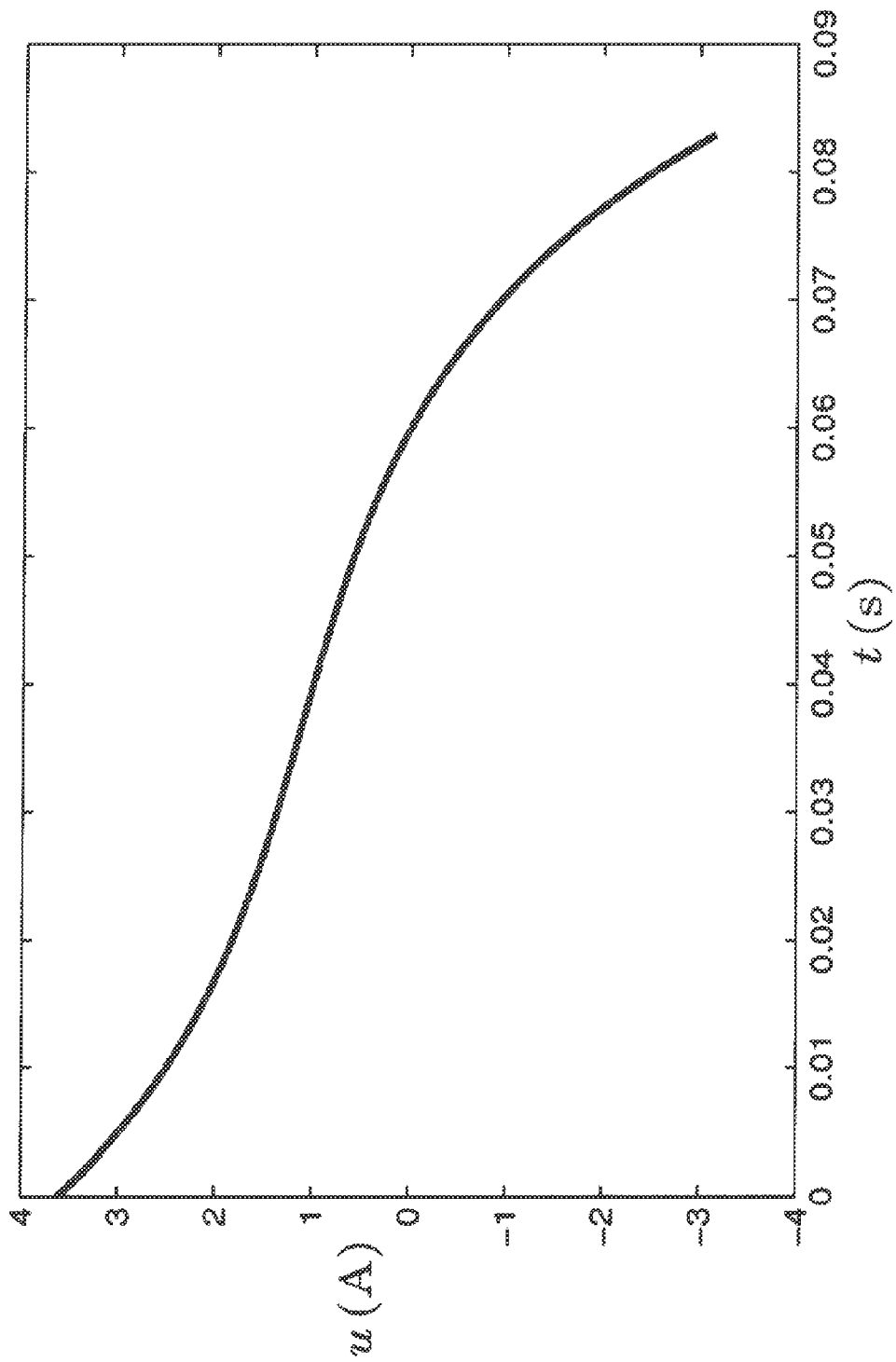
Figure 11A:
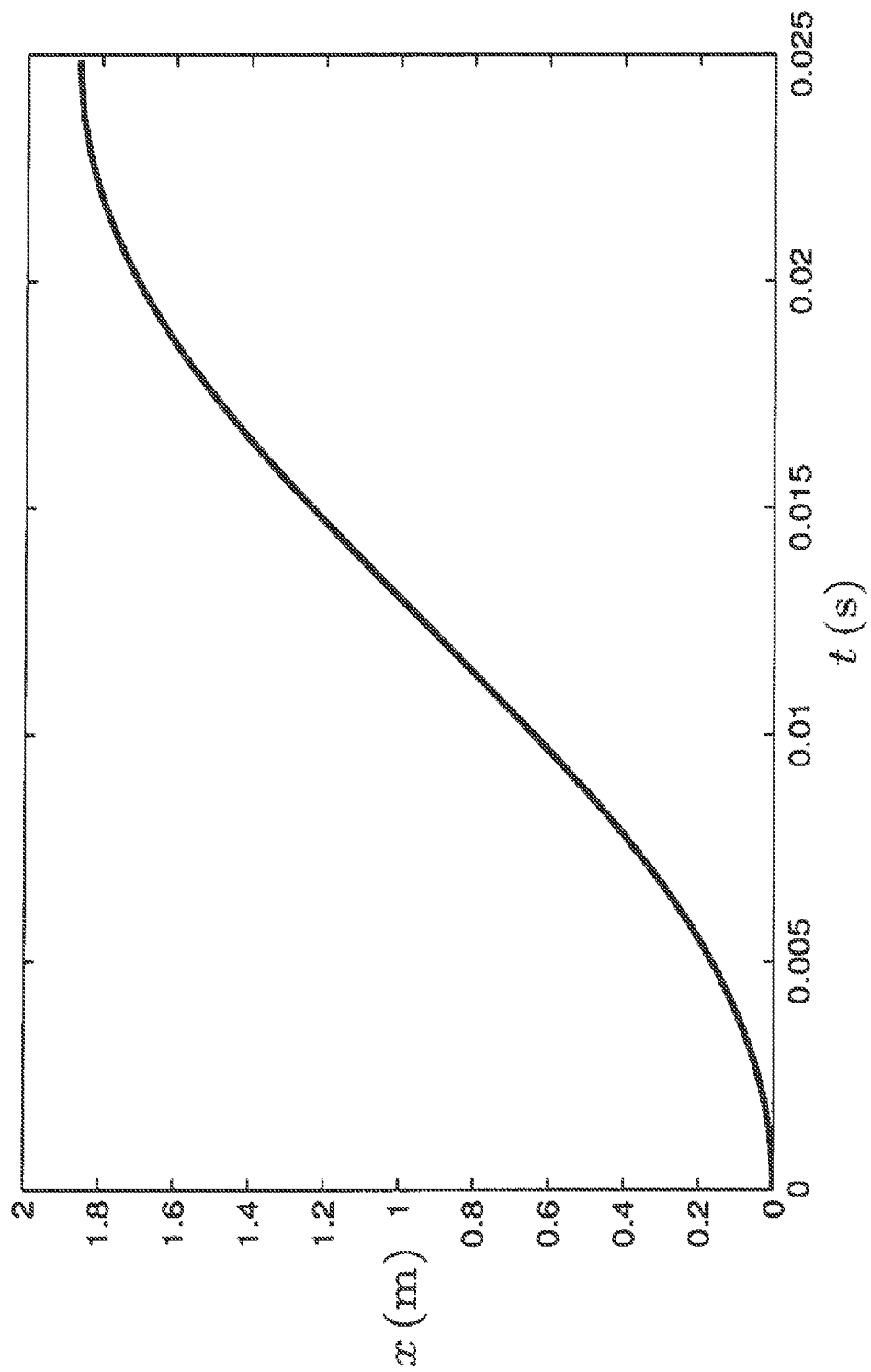
FIG. 11A-11C are graphs of energy efficient motor control position, velocity, and control input profiles, respectively, for a case with active acceleration constraint but without active velocity constraint according to embodiments of the invention.
Figure 11B:
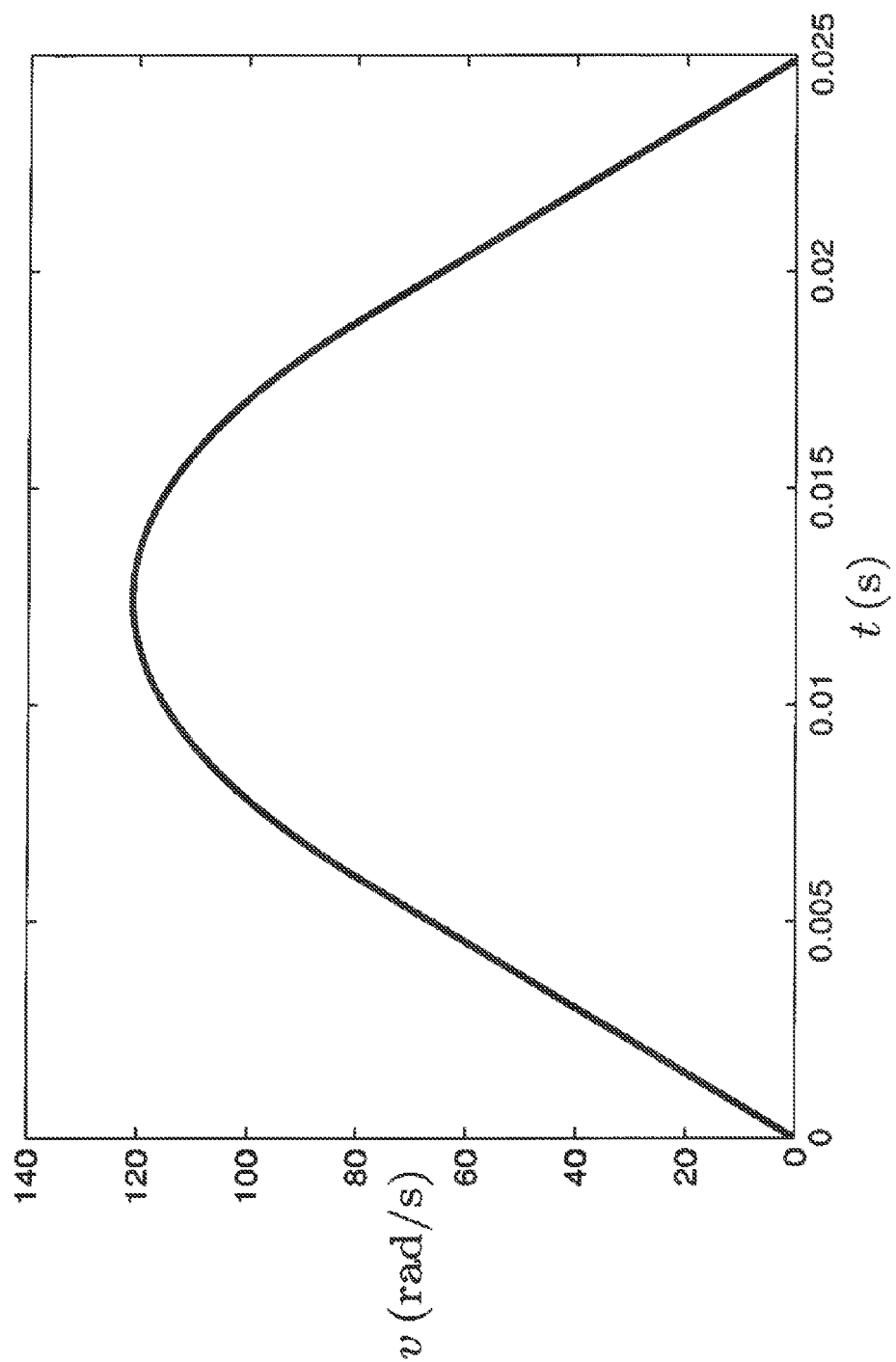
Figure 11C:
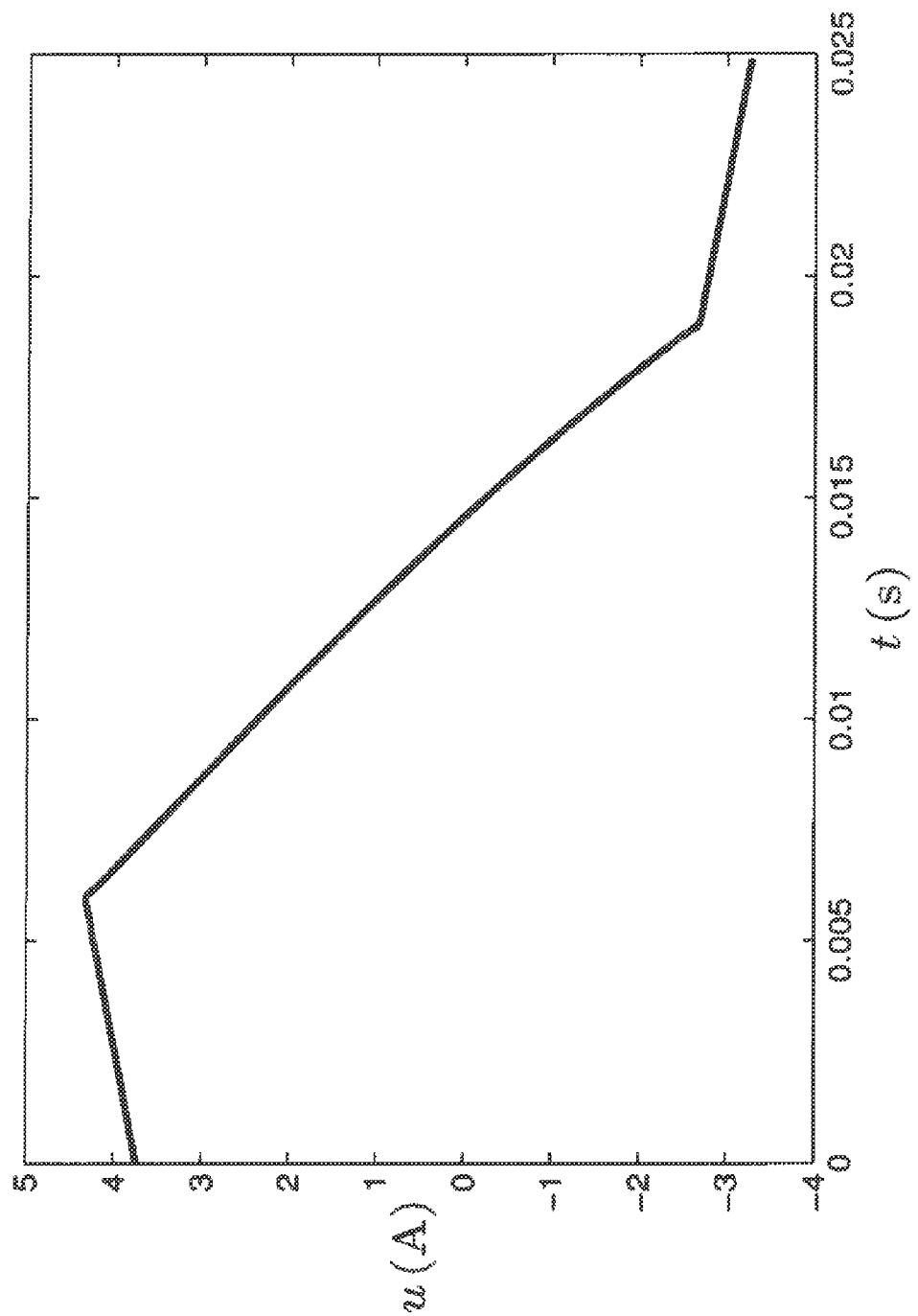
Figure 12A:
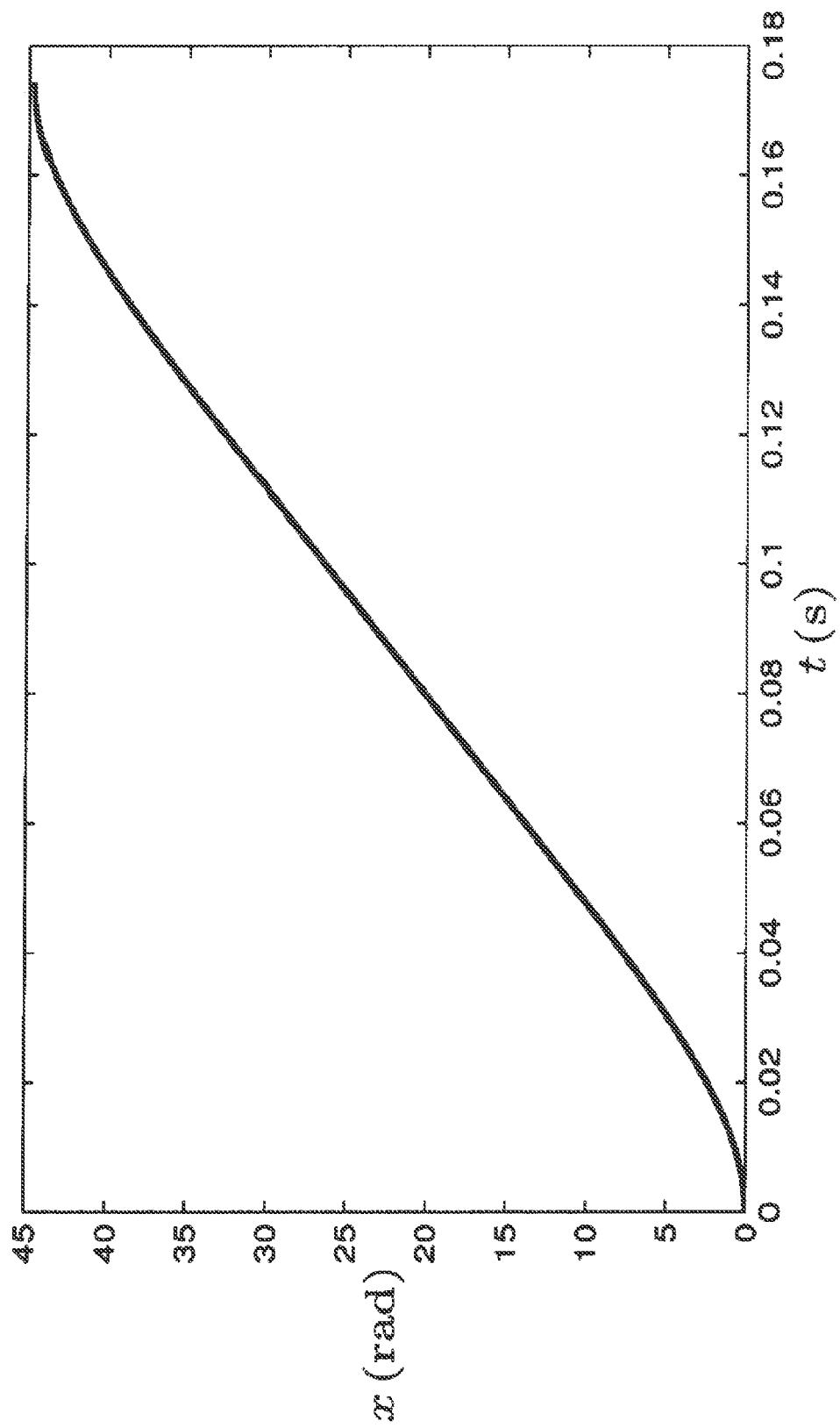
FIG. 12A-12C are graphs of energy efficient motor control position, velocity, and control input profiles, respectively, for a case with active acceleration and velocity constraints according to embodiments of the invention.
Figure 12B:
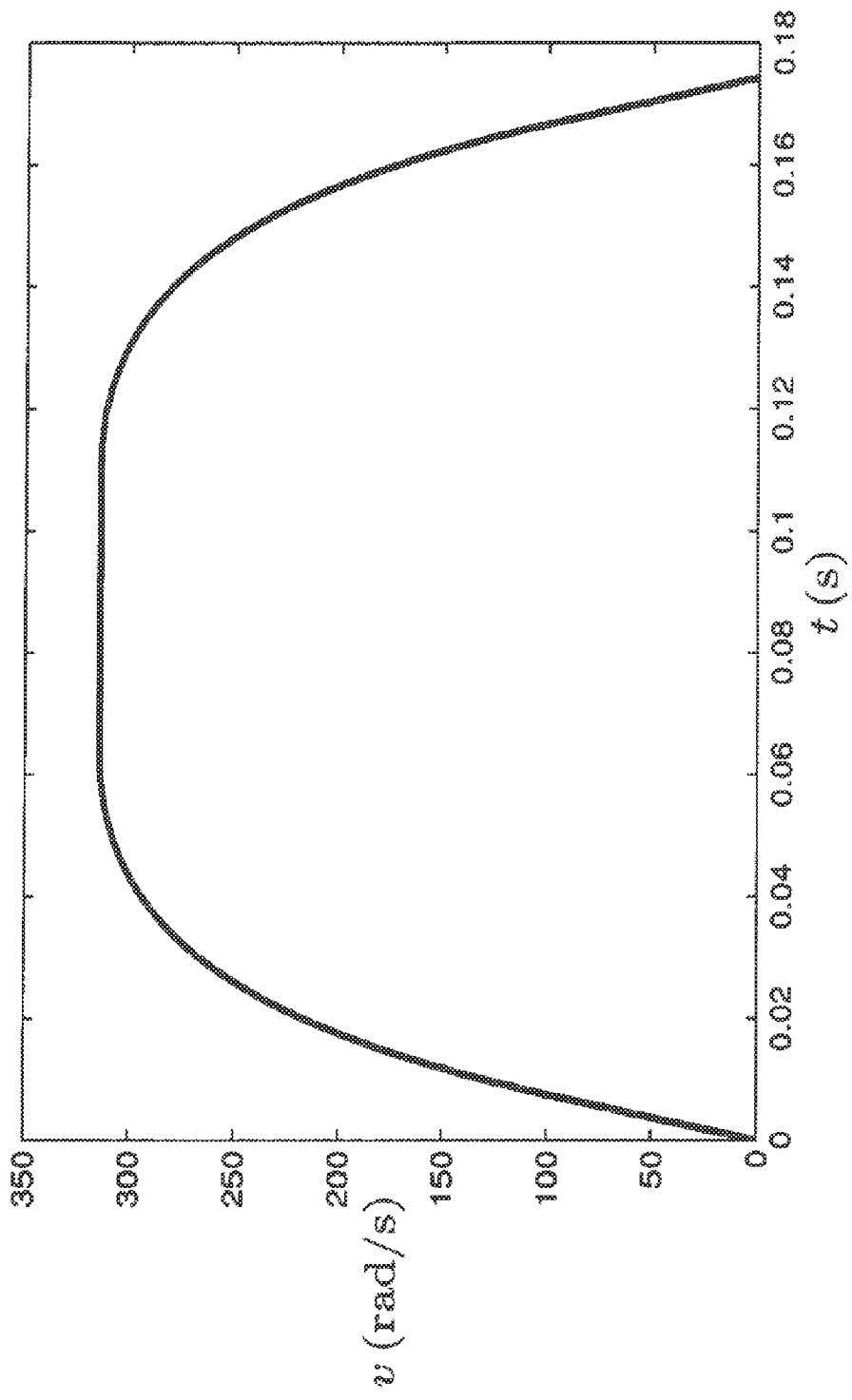
Figure 12C:
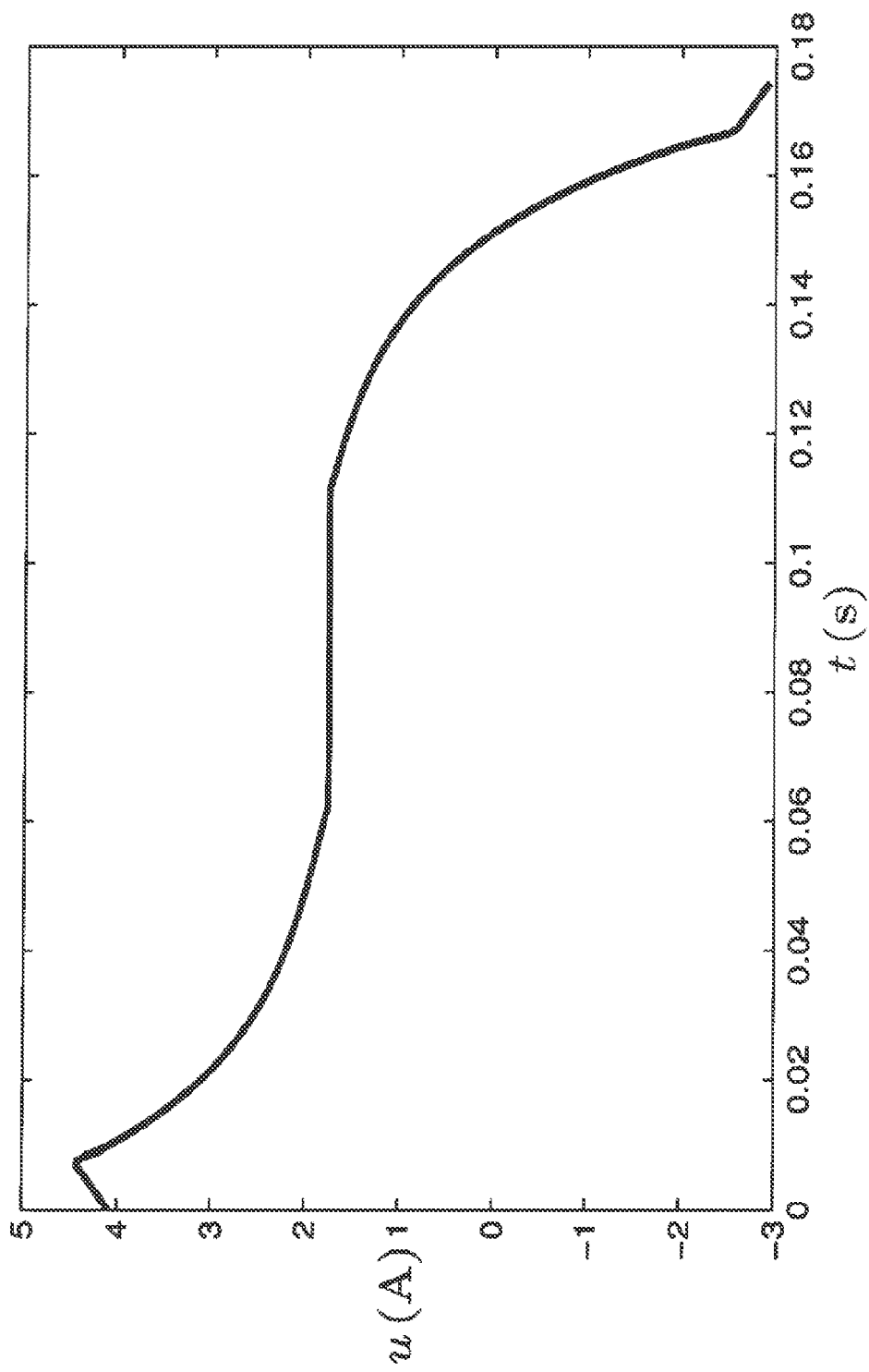

FIG. 8 shows the steps of the optimal solution for Problem 1. The partial equivalence between the two optimal velocity profiles $v^*$ and $\tilde{v}^*$ are shown in FIG. 9.

The steps in FIG. 8 are described in detail below:
Detailed Description Step
800 Initialize the solver by setting $\eta_i = 1$, where $0 < \epsilon \ll 1$ is the tolerance parameter deciding the accuracy of the final solution, Let $i=1$ and $\delta_i = 0$.
805 Solve Problem 3 with initial time 0, final time $\tau_f = t_f - \delta_i$ and BC $x_o = 0, v_o = 0, x(\tau_1) = x_f - \delta_i v_{max}, v(\tau_f) = 0$.
810 Solve the equation $\dot{v}(t_s) = 0$ for $t_s \in [t_1^*, t_2^*]$ using the standard Newton's method. Then $\max_t \tilde{v}^*(t) = v(t_s)$. $\eta_i = v(t_s) - v_{max}$.
815 If $\eta_i \leq 0$, then the velocity constraint is not violated, the optimal solution is found, goto step S6. Otherwise, the velocity constraint is violated, then let $i = i + 1$, and go to step S11,
820 If $i = 2$, make a guess $\delta_i \in (0, t_f)$ of the velocity constraint saturation time. A reasonable guess would be $$\delta_i = \frac{A_{min}}{2(A_{min} - A_{max})} \left[ t_f - \sqrt{t_f^2 + 2\left(\frac{A_{max} - A_{min}}{A_{max} A_{min}}\right) x_f} \right].$$

Otherwise, update $\delta_i$ using the Newton's method as $$\delta_i = \delta_{i-1} - \left(\frac{\eta_{i-1} - \eta_{i-2}}{\delta_{i-1} - \delta_{i-2}}\right)^{-1} \eta_{i-1},$$

825 Set up the BC $x(0) = 0, v(0) = 0$ at the initial time $t = 0$, and $x(\tau_f) = x_f - \delta_i v_{max}, v(\tau_f) = 0$ at the final time $\tau_f = t_f - \delta_i$.
830 Solve Problem 3 with the BC specified in S12.
835 If $|\eta_i| < \epsilon$, then the specified tolerance is met, go to S15. Otherwise, let $i = i + 1$, and go to step S11.
840 Specify the velocity saturation time in the optimal solution with $\Delta_t^* = \delta_i$. The corresponding BC for Problem 3 would be $x(0) = 0, v(0) = 0$ at the initial time $t = 0$, and $x(\tau_f) = x_f - \Delta_t^* v_{max}, v(\tau_f) = 0$ at the final time $t = \tau_f = t_f - \Delta_t^*$.
845 Recover the trajectory of Problem 1 with simplified cost function from the optimal solution of Problem 3 as described by equations (14), (15), and (16).

Optimal Solutions

The optimal solution for three representative cases given by the disclosed method are shown in FIGS. 10A-10C, 11A-

11C, and 12A-12C. It is clear that our method fully addresses the acceleration and velocity constraints such that the optimal solutions found by the disclosed method do not violate any constraints.

Using our method, it takes less than 40 ms to find the optimal solution for each test case. The average computation time is 7.2 ms, which is fast enough for real time energy saving motor control applications.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A method for generating a trajectory for a motion controlled actuator, comprising the steps of:
   initializing data for solving a two-point boundary value problem (TBVP);
   solving the TBVP associated with a first cost function that represents energy consumption of a motion control system using the data and an analytical solver to obtain an analytic solution for unconstrained motor optimal control subject to boundary condition (BC);
   updating the BC and iterating beginning at the solving step if an acceleration constraint is violated; otherwise
   updating the BC and iterating beginning at the solving step if a velocity constraint is violated; and otherwise
   setting the trajectory to the solution of the TBVP if the acceleration constraint and the velocity constraint are satisfied, wherein the steps are performed in a processor.

2. The method as in claim 1, further comprising:
   approximating the energy consumption of the motion control system by a second cost function including a copper loss and a mechanical work of the motor.

3. The method as in claim 1, wherein the initialization further comprising:
   precomputing a set of matrices based on different parameters in a motor model; and
   determining the BCs of TBVP.

4. The method as in claim 1, further comprising:
   identifying the violation of the acceleration constraints using a tangential condition on the analytic solution.

5. The method as in claim 1 wherein the acceleration and speed constrained minimum energy problem is solved using the analytic solution to the unconstrained minimum energy problem, an analytic expression of an acceleration constrained arc, an analytic expression of a deceleration constrained arc, and an analytic expression of a speed constrained arc.

6. The method as in claim 1 wherein the junction conditions in the multi-point boundary value Problem (MBVP) associated with the acceleration constrained problem are converted to equivalent tangent conditions.

7. The method as in claim 5 wherein switching times for exiting the acceleration constrained arc and for entering the deceleration constrained arc are updated to guarantee the convergence of the switching times to the optimal values.

8. The method as in claim 1 to identify the violation of velocity constraint by checking the violation at a single point only.

9. A method of claim 6 wherein the MBVP is solved by solving a converging series of TBVPs.

10. The method as in claim 9 further comprising reducing the dimension of the TBVP by utilizing the structures the optimal solutions, wherein the structures are obtained analytically using an optimal control theory.

11. The method as in claim 10 further comprising: simplifying the MBVP with both velocity and acceleration constraints by removing the velocity constraint, and forming another equivalent problem with the acceleration constraint only.

12. The method as in claim 10 further comprising: solving the acceleration and velocity constrained minimum energy motor control problem by solving acceleration constrained minimum energy motor control problems iteratively, and recovering the solution to the acceleration and velocity constrained minimum energy motor control problem using the iteration result.

13. The method as in claim 10 further comprising: combining a Newton's method and the solver for the acceleration constrained minimum energy motor control problem to compute the optimal switching times for entering and exiting the speed constrained arc.

* * * * *